US012708127B2

(12) United States Patent
Kang et al.

(10) Patent No.: US 12,708,127 B2
(45) Date of Patent: Aug. 18, 2026

(54) PEPTIDE COMPOUNDS FOR FLAVOR MODULATING

(71) Applicant: CJ CheilJedang Corporation, Seoul (KR)

(72) Inventors: Ji Hyun Kang, Seoul (KR); Mikyoung Chae, Seoul (KR); Eunyong Lee, Seoul (KR); Thomas Hofmann, Freising (DE); Corinna Dawid, Freising (DE); Verena Karolin Mittermeier Klessinger, Freising (DE); Manon Juenger, Freising (DE)

(73) Assignee: CJ CHEILJEDANG CORPORATION, Seoul (KR)

( * ) Notice: Subject to any disclaimer, the term of this patent is extended or adjusted under 35 U.S.C. 154(b) by 216 days.

(21) Appl. No.: 18/575,286

(22) PCT Filed: Jun. 28, 2022

(86) PCT No.: PCT/KR2022/009262

§ 371 (c)(1),
(2) Date: Dec. 28, 2023

(87) PCT Pub. No.: WO2023/277549

PCT Pub. Date: Jan. 5, 2023

(65) Prior Publication Data

US 2024/0315296 A1 Sep. 26, 2024

(30) Foreign Application Priority Data

Jul. 1, 2021 (KR) ........................ 10-2021-0086643

(51) Int. Cl.
*A23L 27/30* (2016.01)
*A23L 7/104* (2016.01)
*A23L 27/00* (2016.01)

(52) U.S. Cl.
CPC ............... *A23L 27/32* (2016.08); *A23L 7/104* (2016.08); *A23L 27/88* (2016.08)

(58) Field of Classification Search
CPC ........... A23L 27/32; A23L 7/104; A23L 27/88
(Continued)

(56) References Cited

U.S. PATENT DOCUMENTS 5,780,090 A 7/1998 Frerot et al.
2014/0205729 A1 7/2014 Didzbalis et al.
(Continued)

FOREIGN PATENT DOCUMENTS

CN 103501635 A 1/2014
CN 107118258 A 9/2017
(Continued)

OTHER PUBLICATIONS

Chen, "Isolation and identification of flavor peptides in soy sauce", Engineering Master's Thesis, South China University of Technology, Apr. 2018, pp. 51-69.
(Continued)

*Primary Examiner* — Brent T O'Hern
(74) *Attorney, Agent, or Firm* — Morgan, Lewis & Bockius LLP

(57) ABSTRACT

The present application investigates a new flavor modulating compound having a flavor modulating effect in Korean food which is based on fermentation techniques, and thus shows excellent effects of modulating the flavor of food.

13 Claims, 12 Drawing Sheets

Specification includes a Sequence Listing.

(58) Field of Classification Search
USPC .......................................................... 426/656
See application file for complete search history.

(56) References Cited

U.S. PATENT DOCUMENTS

| | | | |
|---|---|---|---|
| 2015/0282506 A1 | 10/2015 | Taylor et al. | |
| 2021/0000152 A1* | 1/2021 | Hofmann ........... | C07K 5/06078 |

FOREIGN PATENT DOCUMENTS

| | | | |
|---|---|---|---|
| CN | 112533485 | A | 3/2021 |
| EP | 0186292 | A2 | 7/1986 |
| JP | 2001-089500 | A | 4/2001 |
| JP | 2002-255994 | A | 9/2002 |
| JP | 2003-104997 | A | 4/2003 |
| JP | 2006-160649 | A | 6/2006 |
| JP | 2011-115186 | A | 6/2011 |
| JP | 2013-017402 | A | 1/2013 |
| JP | 6324349 | B2 | 5/2018 |
| KR | 10-2008-0090033 | A | 10/2008 |
| KR | 10-2011-0132474 | A | 12/2011 |
| WO | 2010/114022 | A1 | 10/2010 |
| WO | 2013/005362 | A1 | 1/2013 |
| WO | 2016/189385 | A2 | 12/2016 |
| WO | 2017-054866 | A1 | 4/2017 |
| WO | 2019/183265 | A1 | 9/2019 |
| WO | 2022/115837 | A1 | 6/2022 |
| WO | 2022/148418 | A1 | 7/2022 |

OTHER PUBLICATIONS

Office Action issued in corresponding Chinese Patent Application No. 202280047092.1, dated Aug. 2, 2025.

Schindler et al., "Discovery of Salt Taste Enhancing Arginyl Dipeptides in Protein Digests and Fermented Fish Sauces by Means of a Sensomics Approach", J. Agric. Food Chem., vol. 59, 2011, pp. 12578-12588.

Office Action issued in corresponding Korean Patent Application No. 10-2022-0079209, dated Sep. 13, 2024.

Office Action issued in corresponding Korean Patent Application No. 10-2022-0079213, dated Sep. 13, 2024.

Office Action issued in corresponding Korean Patent Application No. 10-2022-0079214, dated Sep. 13, 2024.

Kim et al., "Quantitative Structure-Activity Relationship Study of Bitter Peptides", J. Agric. Food Chem., vol. 54, 2006, pp. 10102-10111.

Miyoshi et al., "Purification and Characterization of a Novel Dipeptidyl Carboxypeptidase from a Streptomyces Species", J. Biochem., vol. 112, No. 2, 1992, pp. 253-257.

Monastyrskaia et al., "Effect of the umami peptides on the ligand binding and function of rat mGlu4a receptor might implicate this receptor in the monosodium glutamate taste transduction", British Journal of Pharmacology, vol. 128, 1999, pp. 1027-1034.

Office Action issued in corresponding Australian Patent Application No. 2022304458, dated May 16, 2025.

Extended European Search Report issued in European Patent Application No. 22833604.6, dated May 12, 2025.

Notice of Allowance issued in corresponding Korean Patent Application No. 10-2022-0079213, dated Jun. 27, 2025.

Notice of Allowance issued in corresponding Korean Patent Application No. 10-2022-0079214, dated Jun. 27, 2025.

International Search Report (with partial translation) and Written Opinion issued in corresponding International Patent Application No. PCT/KR2022/009262 dated Sep. 27, 2022.

Sebald et al., ".Sensoproteomics: A New Approach for the Identification of Taste-Active Peptides in Fermented Foods" J. Agric. Food Chem., 2018, 66, 42, 11092-11104.

* cited by examiner

【FIG. 1】
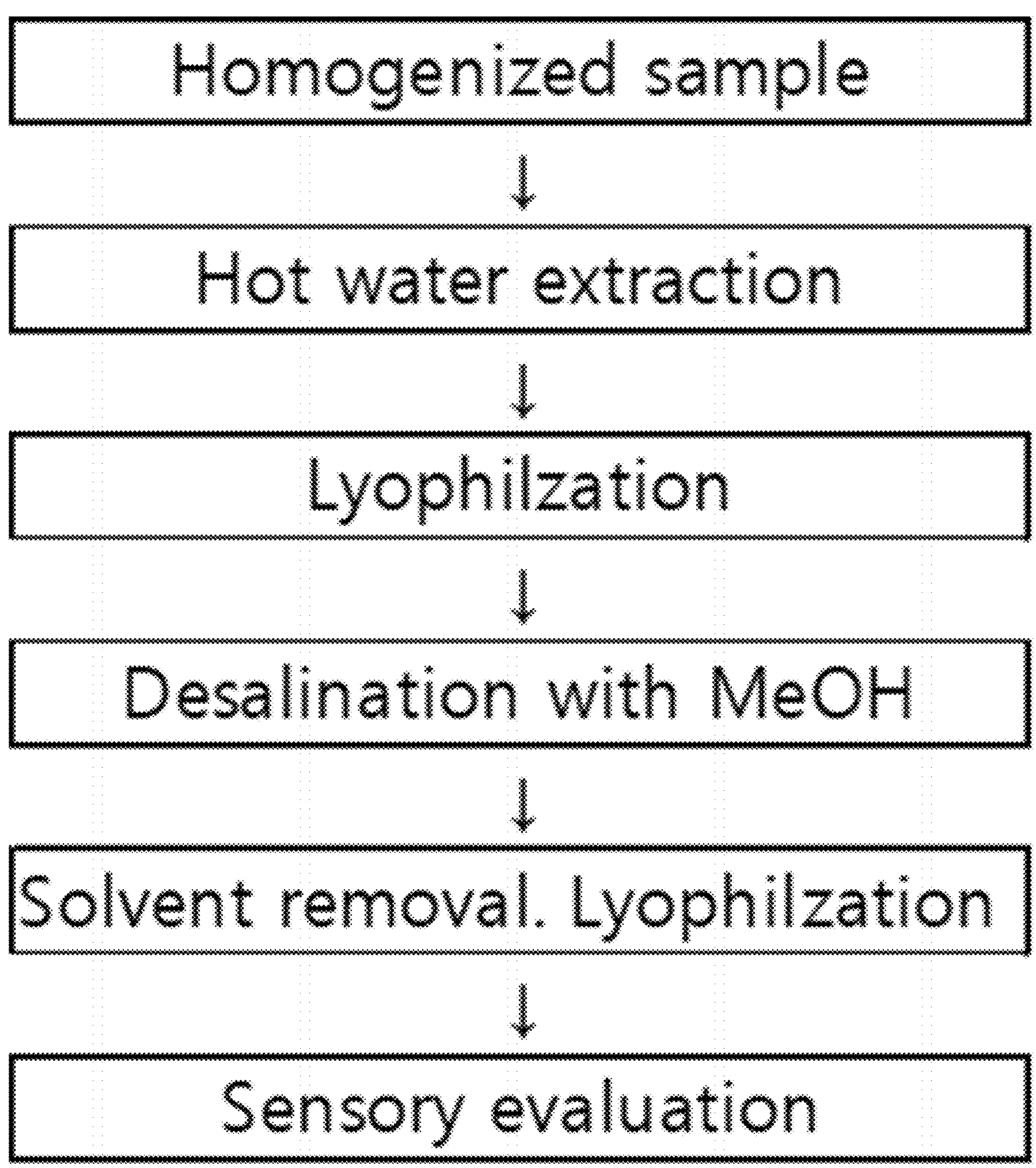

【FIG. 2a】
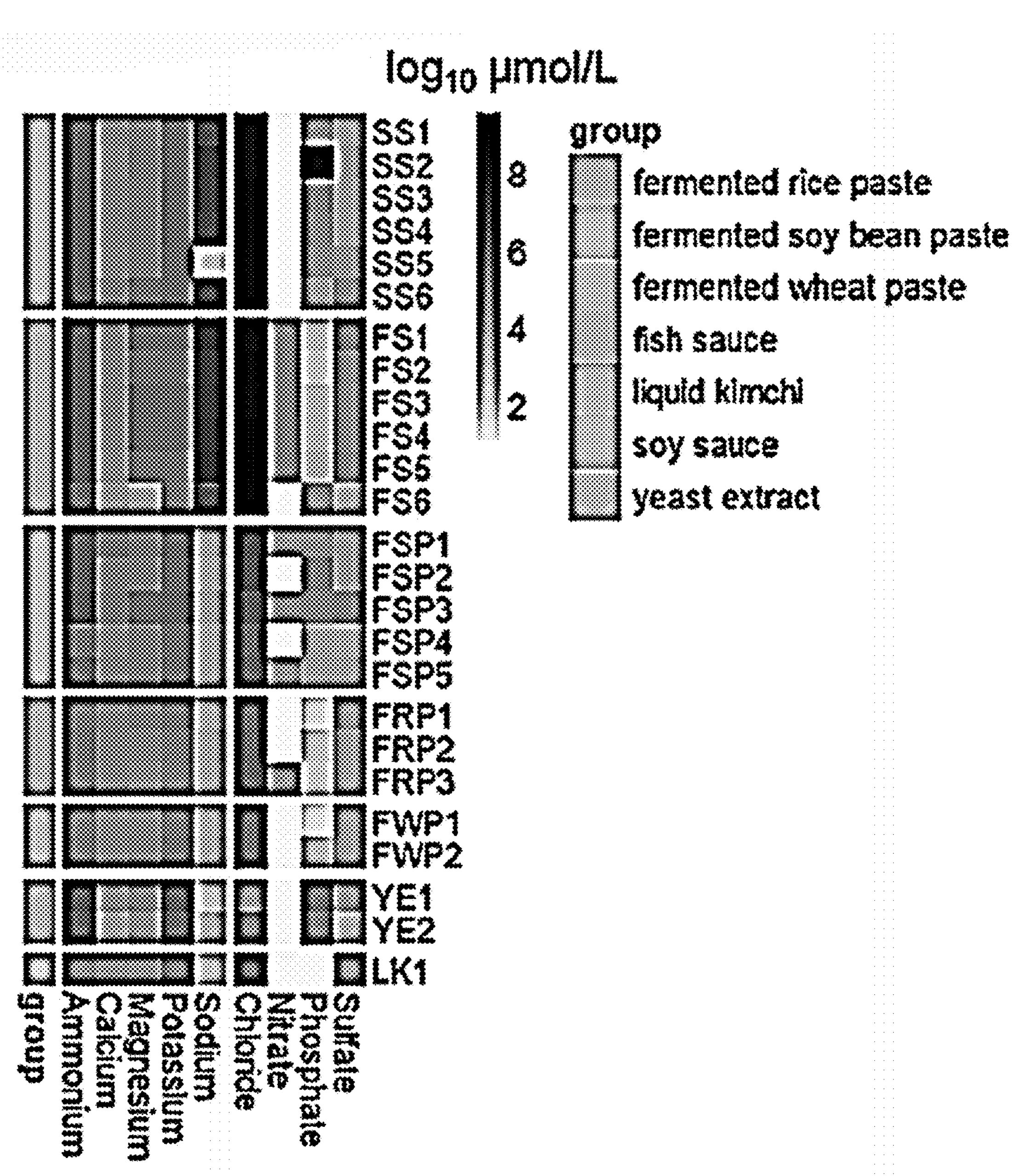

【FIG. 2b】
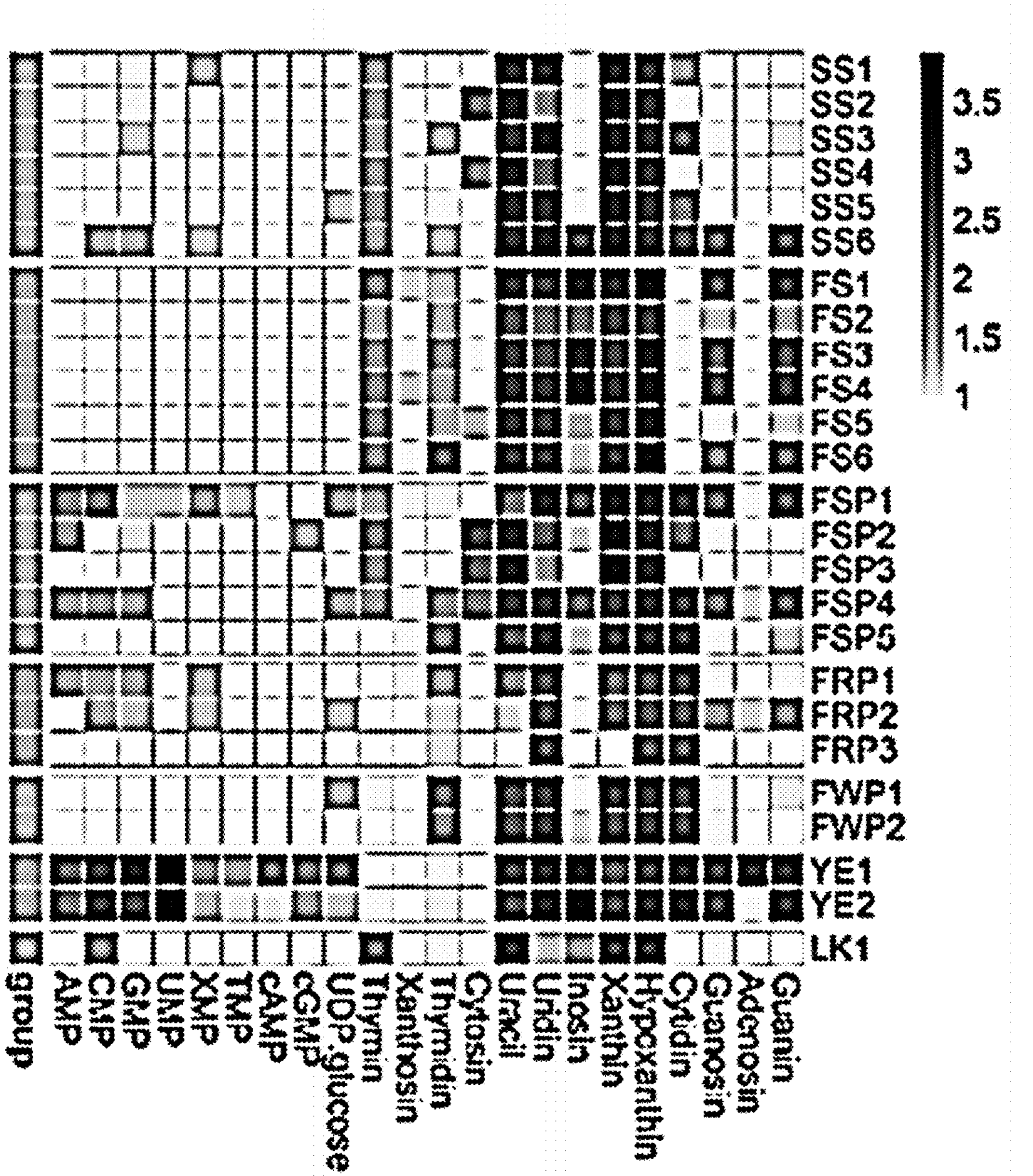

【FIG. 2c】
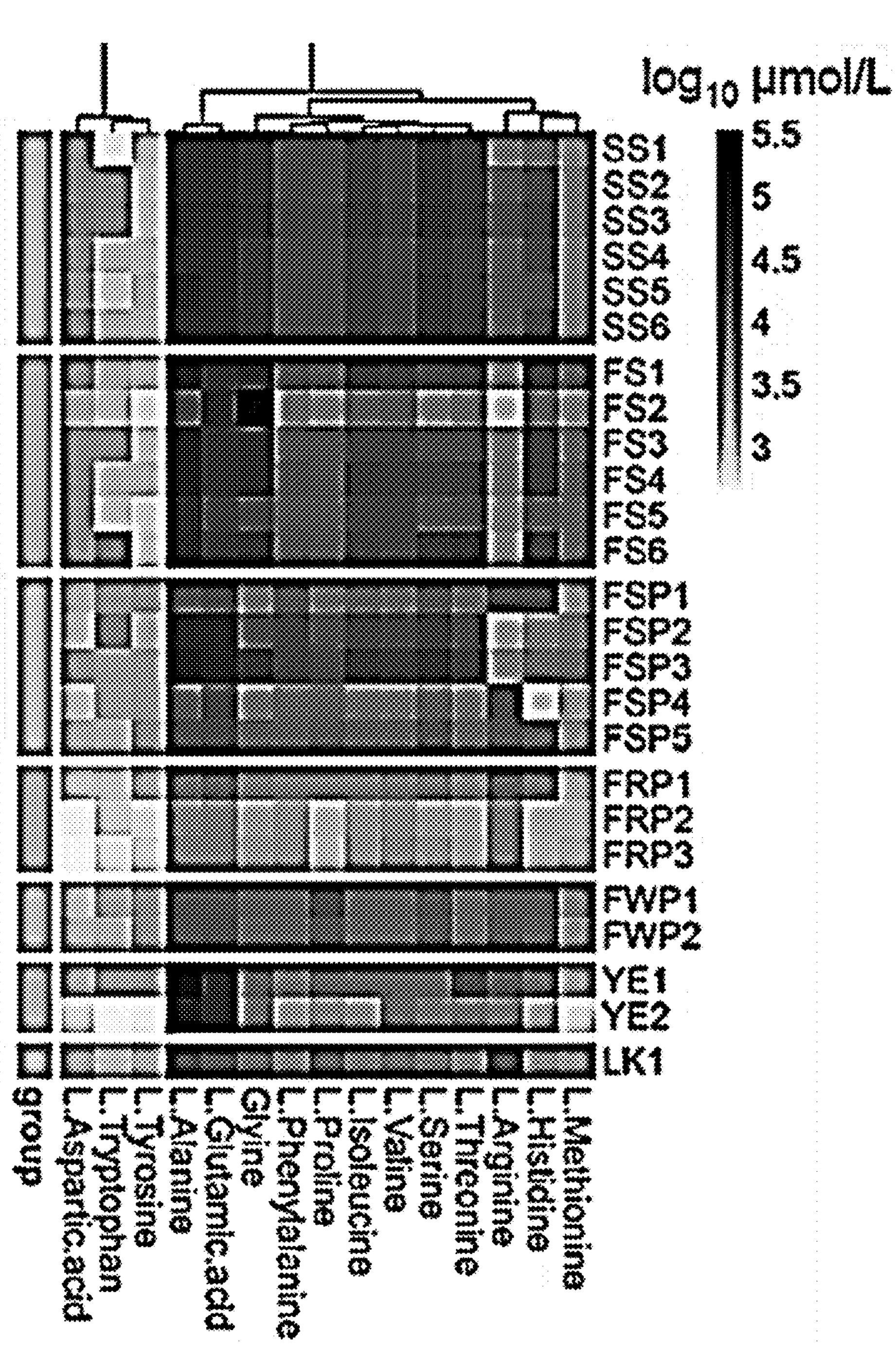

【FIG. 2d】
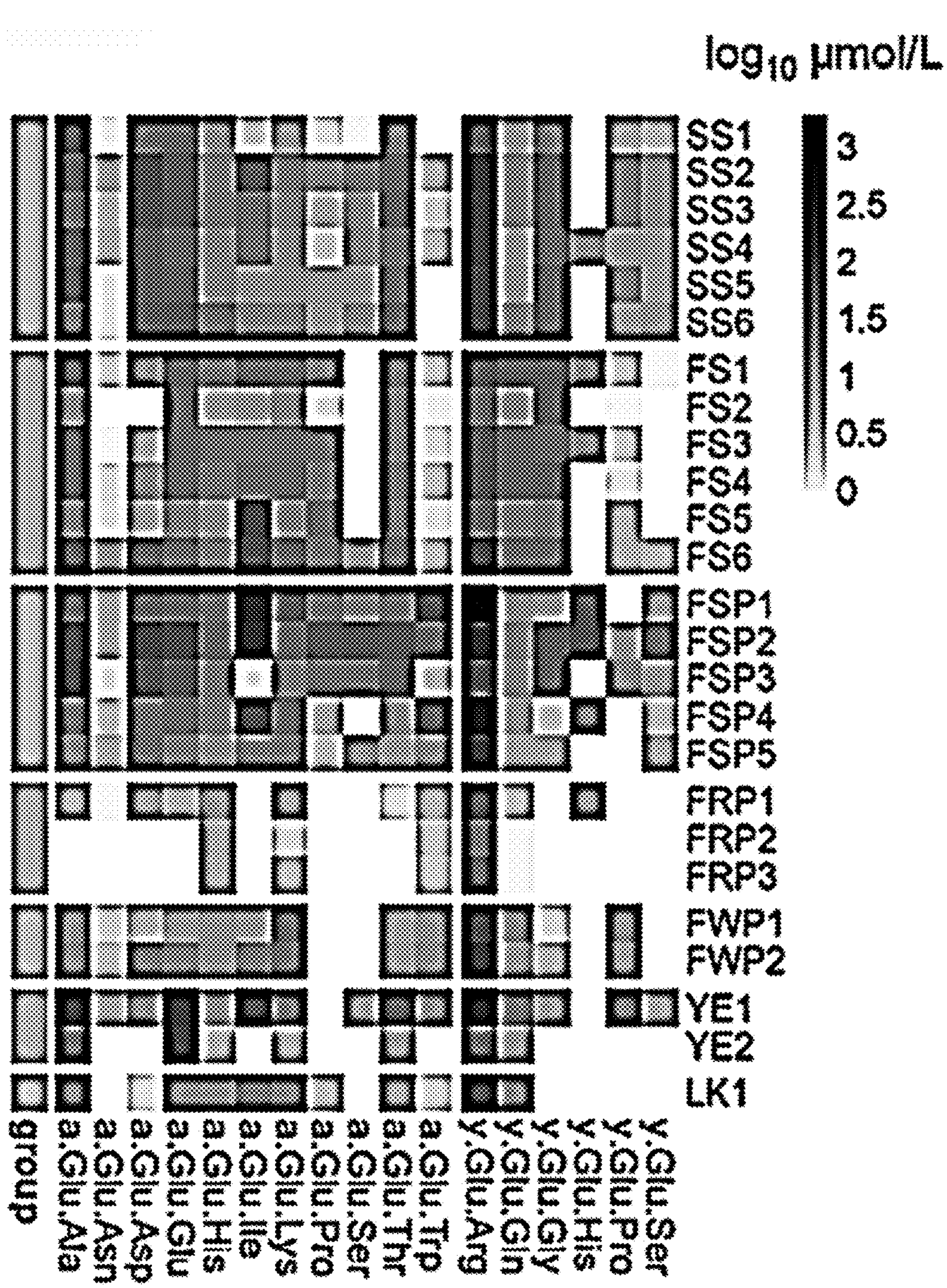

【FIG. 3】
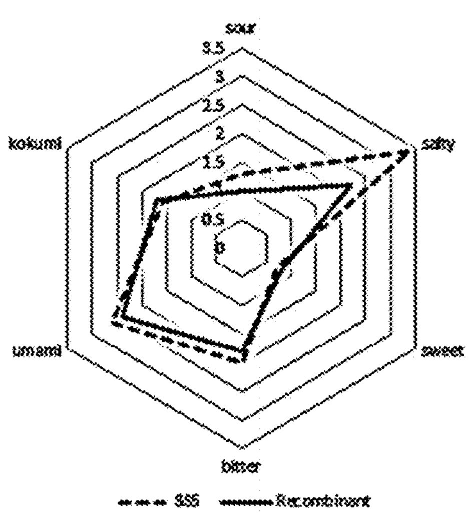
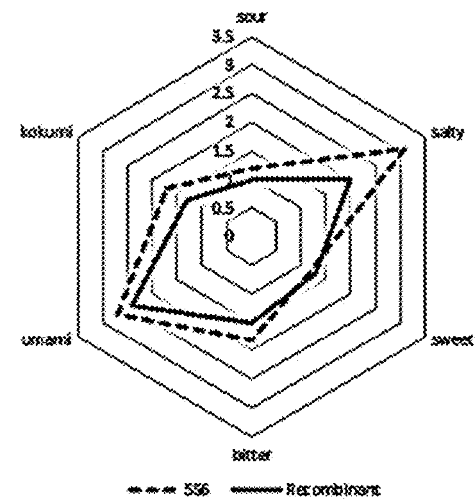
【FIG. 4】
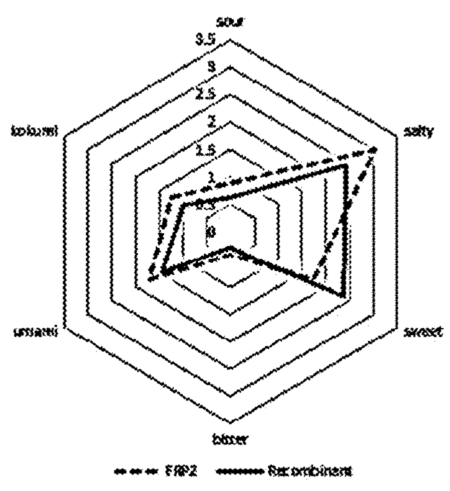
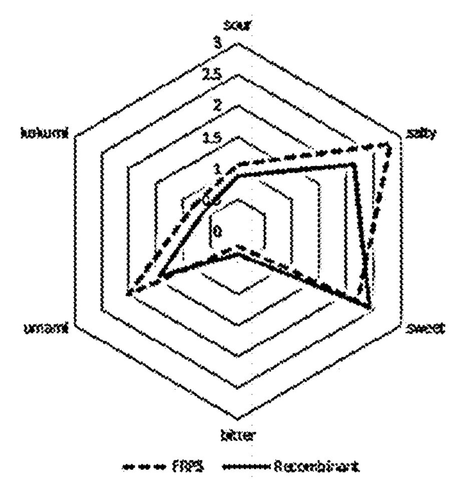

【FIG. 5】
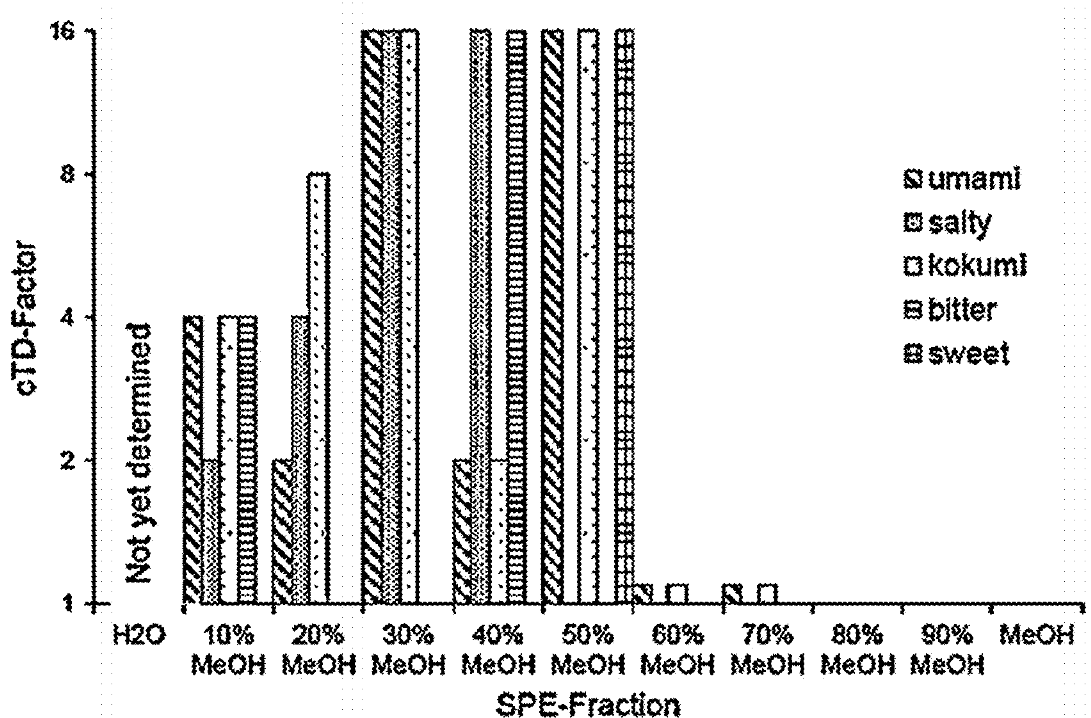

【FIG. 6】
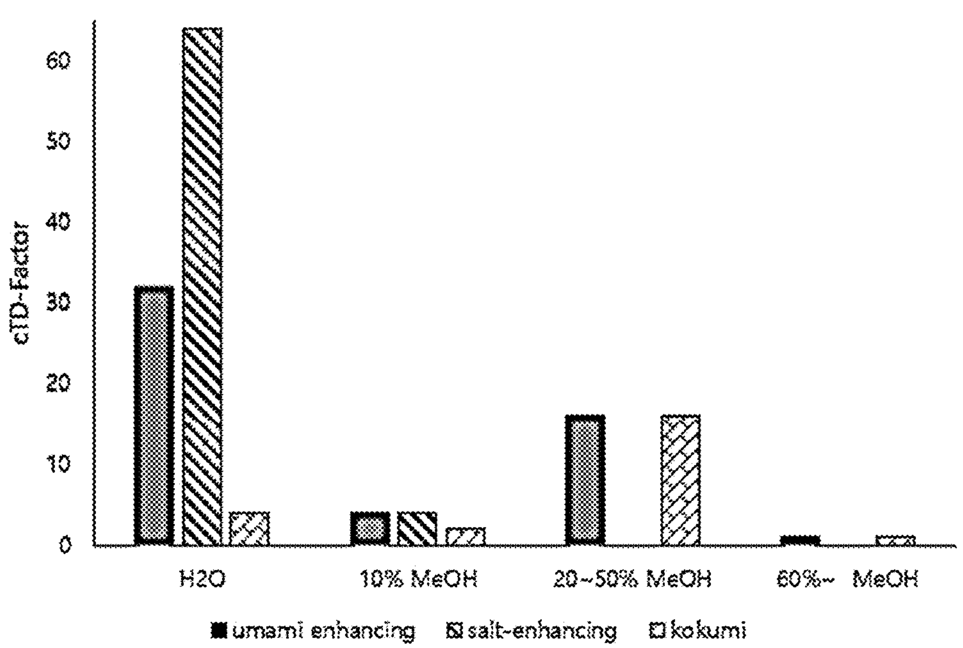

【FIG. 7】
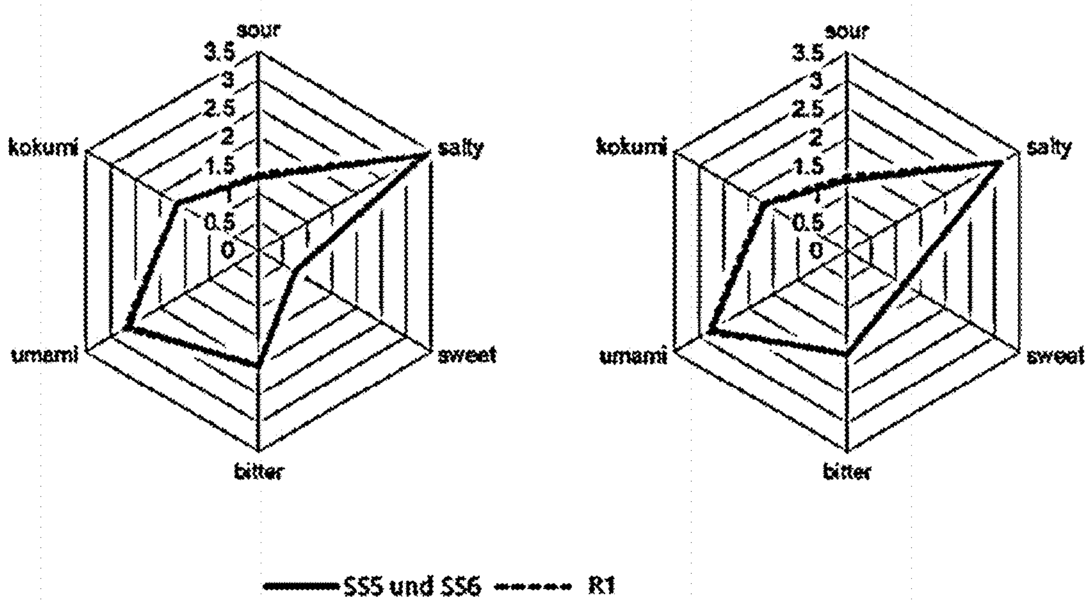
【FIG. 8】
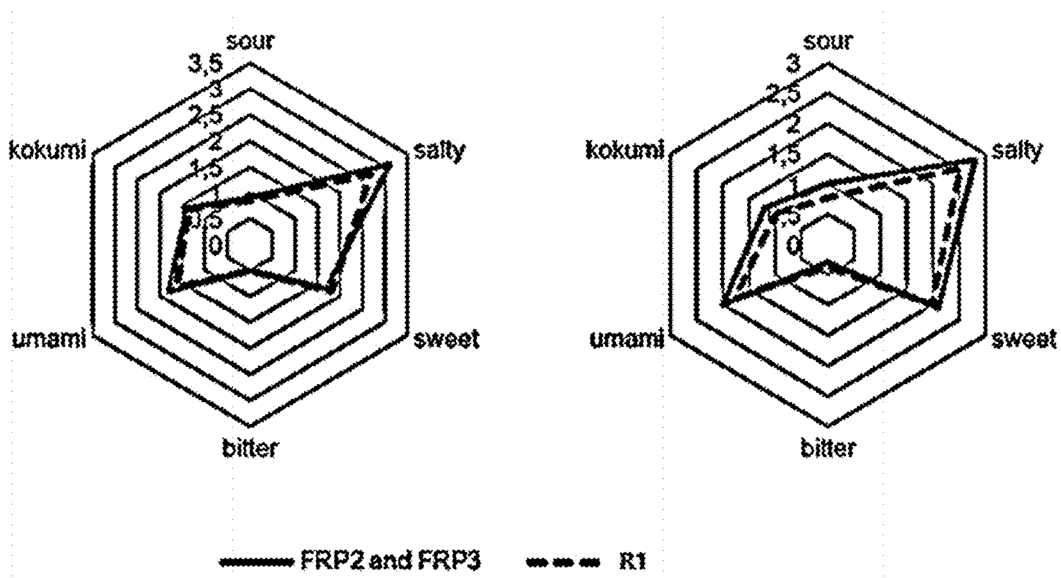

【FIG. 9】
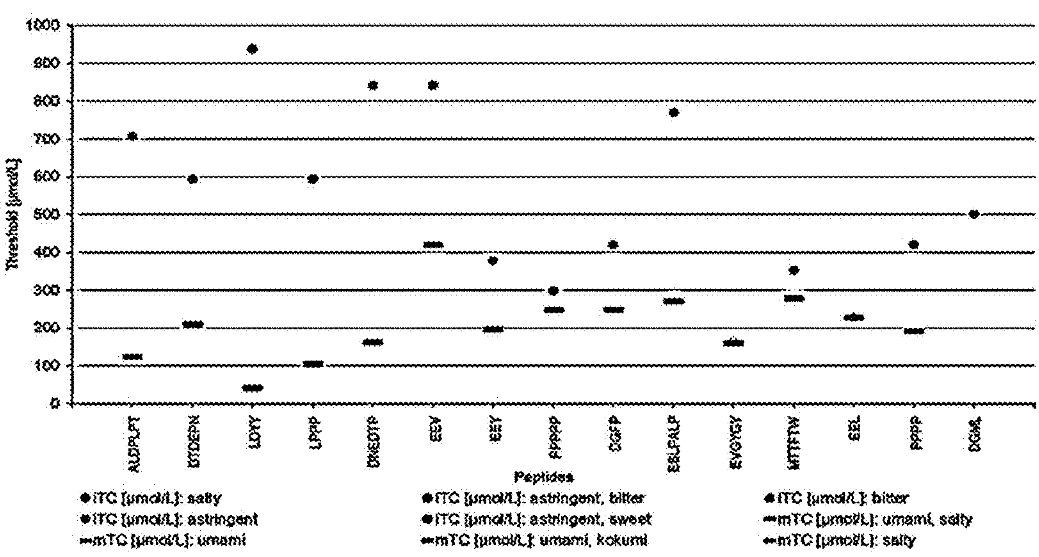

【FIG. 10】
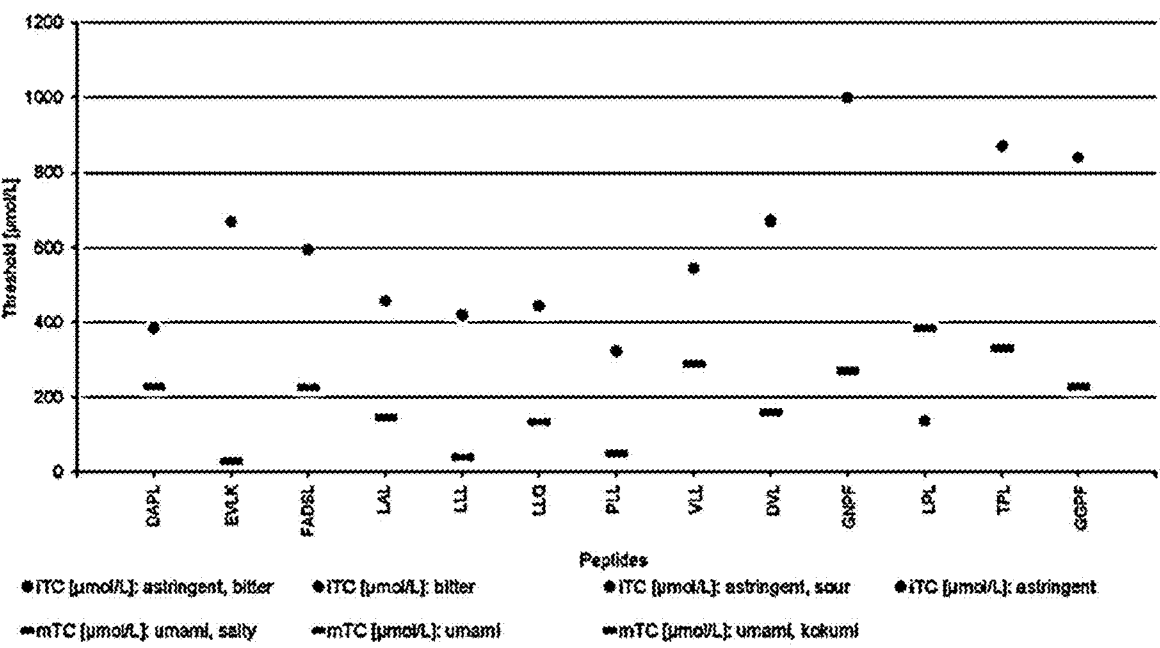

【FIG. 11】
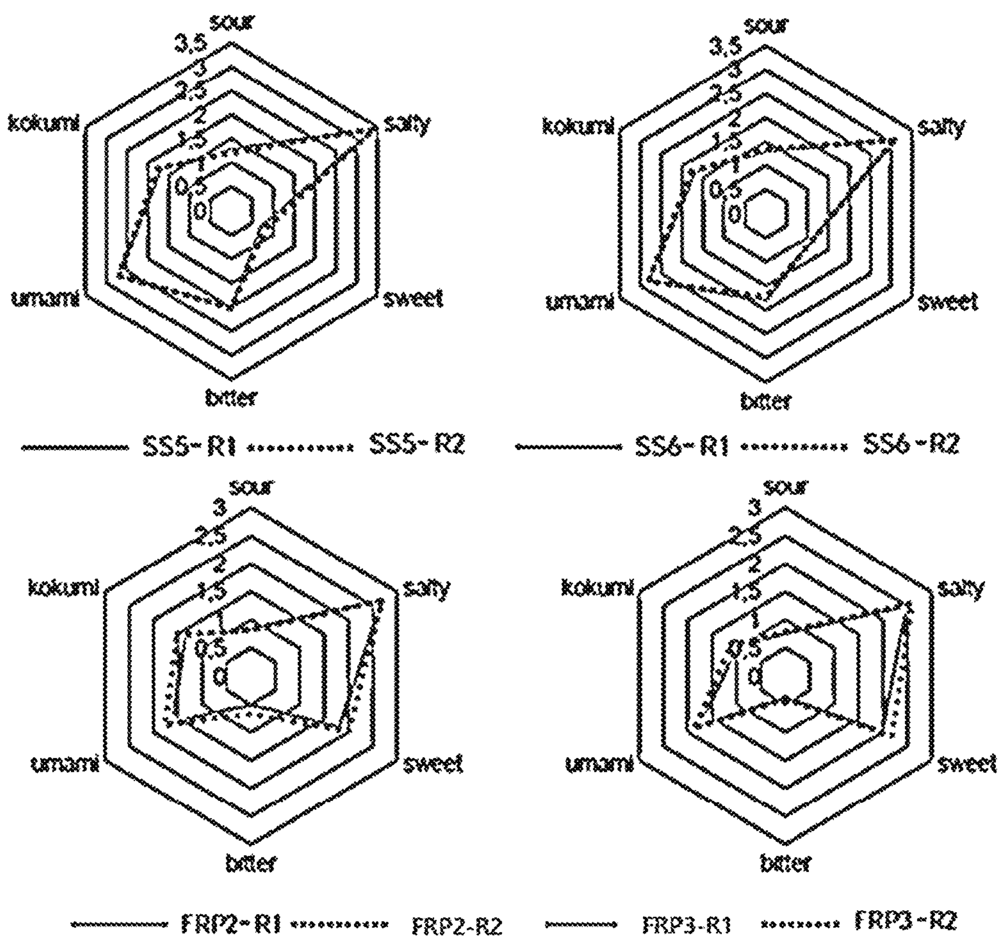

PEPTIDE COMPOUNDS FOR FLAVOR MODULATING

A computer readable text file, entitled "133660-03-8022-US_Sequence_Listing_ST25," created on or about Dec. 28, 2023, with a file size of 4,530 bytes contains the sequence listing for this application and is hereby incorporated by reference in its entirety.

TECHNICAL FIELD

Cross-Reference to Related Application(s)

The present application claims the benefit of the priority based on Korean Patent application No. 10-2021-0086643 filed on Jul. 1, 2021, and the entire contents disclosed in the document of the corresponding Korean patent application are incorporated as a part of the present description.

The present application relates to a peptide compound for flavor modulating.

Background Art

In the food field, taste is usually expressed in five basic tastes of sweet taste, salty taste, sour taste, bitter taste and umami taste. Substances having these basic tastes, or substances modulating a specific taste among them are widely used as seasonings.

On the other hand, Korean fermented foods such as red pepper taste, soybean paste, soy sauce and the like are natural flavor modulating agents, and have an excellent umami taste, so have been widely used as unique seasonings for a long time. These fermented foods have been known to be nutritionally excellent and have effects of controlling blood pressure and improving cardiovascular disease, cancer, inflammation, diabetes and the like. However, inorganic salts such as sodium chloride in fermented foods are salt-inducing substances, and recently, consumers have recognized that excessive salt intake has a great correlation with causing diseases such as increased blood pressure, heart disease, and the like, so they prefer low-salt products, but a decrease in salty taste is inevitably caused when the amount of sodium chloride is reduced.

It has been demonstrated that salt can be reduced without losing the overall taste intensity by adding soy sauce instead of salt in various products, and thus, research to contribute to the overall taste of fermented products by identifying peptides inducing a salty taste and an umami taste in fermented products such as soy sauce is needed.

PRIOR ART

Patent Document

US 2015-0282506 A1

DISCLOSURE

Technical Problem

An object of the present application is to provide a composition for flavor modulating comprising a dipeptide, a long chain peptide, or a combination thereof.

Another object of the present application is to provide a food composition or a food additive composition comprising the composition for flavor modulating.

Other object of the present application is to provide a method for flavor modulating, comprising applying a dipeptide, a long chain peptide, or a combination thereof to a food.

Other object of the present application is to provide a use of a dipeptide, a long chain peptide, or a combination thereof for using in flavor modulating.

Other object of the present application is to provide a use of a dipeptide, a long chain peptide, or a combination thereof for using in preparation of a composition for flavor modulating.

Technical Solution

The present application has newly identified a taste modulation compound having an effect of modulating a taste of Korean food based on fermentation technology, and based on this, it provides a novel substance and a use for taste modulating thereof.

Summary of Terms

Flavor refers to sensation felt from tastes and smell of food, and substances used to make flavor by adding them to food and the like are called flavors (or flavorings, flavoring agents). Savor means a refined taste of food. Sweetness refers to a taste felt from sweet thing such as sugar, honey and the like, and sweeteners may mean substances that taste sweet. Sweeteners may be food or food additives added for the purpose of adding sweetness to food. Seasoning means improving the taste of food, and may mean appropriately adjusting the taste of food.

In the present description, taste may mean 6 kinds of basic tastes of sweet, sour, salty, bitter, umami and kokumi tastes. When components of food are dissolved in water or saliva and reach receptors of taste buds on the tongue, sensation felt by the receptors is called sense of taste, and sense of taste, sense of smell, sense of touch felt in the mouth, sense of pain and the like are integrated to determine the taste of food. Taste of astringent does not correspond to sense of taste, but it is a feeling felt as the soft and sticky membrane on the tongue shrinks and corresponds to sense of pressure.

In the present description, modulating a taste, may mean strengthening the basic taste that food has originally, or giving a new taste that is not present in food. In one embodiment, modulating a taste may mean strengthening umami taste and/or kokumi taste.

In the present description, an amino acid may mean arginine (Arg, R), histidine (His, H), lysine (Lys, K), aspartic acid (Asp, D), glutamic acid (Glu, E), serine (Ser, S), threonine (Thr, T), asparagine (Asn, N), glutamine (Gln, Q), cysteine (Cys, C), glycine (Gly, G), proline (Pro, P), alanine (Ala, A), valine (Val, V), isoleucine (Ile, I), leucine (Leu, L), methionine (Met, M), phenylalanine (Phe, F), tyrosine (Tyr, Y), or tryptophan (Trp, W).

In the present description, the amino acid may be an L-amino acid (the three-dimensional structure of the amino acid is L-form) or D-amino acid (the three-dimensional structure of the amino acid is D-form). In one embodiment, proline of which three-dimensional structure is L-form may be expressed as L-Pro, and proline of which three-dimensional structure may be expressed as D-form. In the present description, unless otherwise specifically indicated, the amino acid refers to an L-amino acid.

Glutamic acid or glutamine among the amino acids can form pyroglutamic acid (pyroGlu, PCA, 5-oxoproline, or pidolic acid) as Chemical formula 1 below, by reacting a side chain group with an amino group to form a cyclic amide. Hereinafter, in the present description, the term, amino acid may be understood as including pyroglutamic acid. The pyroglutamic acid may have R-form or S-form enantiomers.

[Chemical formula 1]

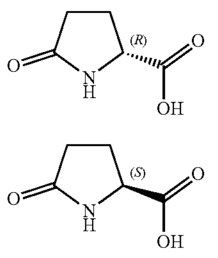

The term dipeptide may refer to a molecule in which 2 amino acids are combined by a peptide bond. The peptide bond means a carboxyl group, which is not a side chain of one amino acid, combines with an amino group, which is not a side chain of the other amino acid, and one water molecule is lost and two amino acids are linked with "—CO—NH—". Carbon to which the amino group is bound in an amino acid is called alpha carbon (a carbon).

Among amino acids, an amino acid comprising a carboxyl group in a side chain such as glutamic acid, the carboxyl group of the side chain combines with an amino group which is not a side chain of the other amino acid, and one water molecule is lost and two amino acids may be linked with "—CO—NH—". This type of bond may also be included in a peptide bond. For example, in case of glutamic acid, a carboxyl group is bonded to a gamma carbon (γ carbon), so when the carboxyl group of the side chain of glutamic acid is combined with an amino group which is not a side chain of the other amino acid to form a dipeptide, "γ" is written in front of the dipeptide, and when the carboxyl group which is not a side chain is combined with an amino group which is not a side chain of the other amino acid to form a dipeptide, "α" is written in front of the dipeptide, thereby distinguishing them. Dipeptides in a form in which "γ" or "α" is not particularly written as above, are α-form dipeptides, in which a carboxyl group which is not a side chain of one amino acid is combined with an amino group which is not a side chain of the other amino acid, which is a general peptide bond.

In one embodiment, the case in that the carboxyl group bound to alpha carbon of glutamic acid and the amino group of alanine are combined is written as "α-Glu-Ala", and the case in that the carboxyl group bound to gamma carbon of glutamic acid and the amino group of alanine are combined is written as "γ-Glu-Ala", thereby distinguishing them.

Pyroglutamic acid among amino acids can form a dipeptide through a peptide bond with another amino acid. In other words, as the carboxyl group of pyroglutamic acid forms a peptide bond with an amino group which is not a side chain of another amino acid, it can be a dipeptide. For example, pyroglutamic acid and proline, pyroglutamic acid and glutamic acid, pyroglutamic acid and glutamine, and pyroglutamic acid and serine form a peptide bond, and thereby, they can be a dipeptide, and they may be written as pyroGlu-Pro, pyroGlu-Glu, pyroGlu-Gln, pyroGlu-Ser, respectively.

The term, long chain peptide may mean a molecule in which 3 or more amino acids are combined by a peptide bond.

In one embodiment, in case of dipeptides or long chain peptides comprising an amino acid such as proline, arginine, glutamic acid and the like among amino acids, they may be written as prolyl peptides, arginyl peptides, glutamyl peptides (α-Glutamyl peptides or γ-Glutamyl peptides), in the meaning that proline, arginine and glutamic acid are comprised, respectively. Cases of other amino acids are same.

Dipeptide

The present inventors have found an excellent flavor modulating effect of dipeptide compounds comprising arginine and/or proline and completed the invention as below.

Accordingly, one aspect provides a composition for flavor modulating comprising a dipeptide. Another aspect, provides a use of the dipeptide for using in flavor modulating. Other aspect, provides a use of the dipeptide for using in preparation of a composition for flavor modulating. The composition for flavor modulating may be expressed as a composition for taste modulating, a composition for savor modulating, a composition for sweetening, a composition for preparing a flavoring agent, and the like.

The dipeptide may be (i) at least one (for example, 1 kind, 2 kinds, 3 kinds, 4 kinds, 5 kinds, 6 kinds, 7 kinds, 8 kinds, 9 kinds, 10 kinds, 11 kinds, 12 kinds, 13 kinds, 14 kinds, 15 kinds, 16 kinds, 17 kinds, 18 kinds, 19 kinds, or all of 20 kinds) selected from dipeptides comprising arginine (Arg) (arginyl-dipeptide, for example, Arg-X, or X-Arg, wherein the X is any one amino acid selected from the previously defined amino acids), (ii) at least one (for example, 1 kind, 2 kinds, 3 kinds, 4 kinds, 5 kinds, 6 kinds, 7 kinds, 8 kinds, 9 kinds, 10 kinds, 11 kinds, 12 kinds, 13 kinds, 14 kinds, 15 kinds, 16 kinds, 17 kinds, 18 kinds, 19 kinds, or all of 20 kinds) selected from dipeptides comprising proline (Pro) (prolyl-dipeptide, for example, Pro-X, or X-Pro, wherein the X is as defined above), or (iii) a combination thereof.

In one embodiment, the dipeptide may be (i) at least one selected from arginyl-dipeptides consisting of Arg-Ala, Ala-Arg, Arg-Arg, Arg-Asn, Asn-Arg, Arg-Asp, Asp-Arg, Arg-Cys, Cys-Arg, Arg-Gln, Gln-Arg, Arg-Glu, Glu-Arg, Arg-Gly, Gly-Arg, Arg-His, His-Arg, Arg-Ile, Ile-Arg, Arg-Leu, Leu-Arg, Arg-Lys, Lys-Arg, Arg-Met, Met-Arg, Arg-Phe, Phe-Arg, Arg-Pro, Pro-Arg, Arg-Ser, Ser-Arg, Arg-Thr, Thr-Arg, Arg-Trp, Trp-Arg, Arg-Val, Val-Arg, Arg-Tyr, and Tyr-Arg, (ii) at least one selected from prolyl-dipeptides consisting of Pro-Ala, Ala-Pro, Pro-Arg, Arg-Pro, Pro-Asn, Asn-Pro, Pro-Asp, Asp-Pro, Pro-Cys, Cys-Pro, Pro-Gln, Gln-Pro, Pro-Glu, Glu-Pro, Pro-Gly, Gly-Pro, Pro-His, His-Pro, Pro-Ile, Ile-Pro, Pro-Leu, Leu-Pro, Pro-Lys, Lys-Pro, Pro-Met, Met-Pro, Pro-Phe, Phe-Pro, Pro-Pro, Pro-Ser, Ser-Pro, Pro-Thr, Thr-Pro, Pro-Trp, Trp-Pro, Pro-Val, Val-Pro, Pro-Tyr, and Tyr-Pro, or (iii) a combination thereof.

In one embodiment, the dipeptide may be (i) at least one selected from arginyl-dipeptides consisting of Arg-Ala, Ala-Arg, Arg-Asp, Asp-Arg, Arg-Gln, Gln-Arg, Arg-Glu, Glu-Arg, Arg-Gly, Gly-Arg, Arg-Leu, Leu-Arg, Arg-Lys, Lys-Arg, Arg-Pro, Pro-Arg, Arg-Ser, Ser-Arg, Arg-Val, and Val-Arg, (ii) at least one selected from prolyl-dipeptides consisting of Pro-Ala, Ala-Pro, Pro-Arg, Arg-Pro, Pro-Asn, Asn-Pro, Pro-Asp, Asp-Pro, Pro-Cys, Cys-Pro, Pro-Gln, Gln-Pro, Pro-Glu, Glu-Pro, Pro-Gly, Gly-Pro, Pro-His, His-Pro, Pro-Ile, Ile-Pro, Pro-Leu, Leu-Pro, Pro-Lys, Lys-Pro, Pro-Met, Met-Pro, Pro-Phe, Phe-Pro, Pro-Pro, Pro-Ser, Ser-Pro, Pro-Thr, Thr-Pro, Pro-Trp, Trp-Pro, Pro-Val, Val-Pro, Pro-Tyr, and Tyr-Pro, (iii) or a combination thereof.

In one specific embodiment, the dipeptide may be (i) at least one selected from arginyl-dipeptides consisting of Arg-Gly and Gly-Arg, (ii) at least one selected from prolyl-dipeptides consisting of Pro-Pro, Pro-Glu, Pro-Ala, Pro-Lys, Pro-Ser, Pro-Val, Arg-Pro, Lys-Pro, Ser-Pro, and Val-Pro, (iii) or a combination thereof.

In one embodiment, the composition for flavor modulating may comprise at least one selected from dipeptides consisting of Pro-Pro, Pro-Glu, Pro-Ala, Pro-Lys, Pro-Ser, Pro-Val, Arg-Pro, Lys-Pro, Ser-Pro, Val-Pro, Arg-Gly, and Gly-Arg, and specifically, may comprise at least one selected from dipeptides consisting of Pro-Pro, Pro-Val, Arg-Pro, Ser-Pro, Val-Pro, Arg-Gly, and Gly-Arg, and further comprise at least one selected from dipeptides consisting of Pro-Glu, Pro-Ala, Pro-Lys, Pro-Ser, and Lys-Pro.

In one embodiment, the composition for flavor modulating may comprise (i) at least one selected from dipeptides consisting of Pro-Pro, Pro-Glu, Pro-Ser, Pro-Val, Arg-Pro, Ser-Pro, Val-Pro, Arg-Gly, and Gly-Arg;

(ii) at least one selected from dipeptides consisting of Pro-Pro, Pro-Ala, Pro-Lys, Pro-Val, Arg-Pro, Ser-Pro, Val-Pro, Arg-Gly, and Gly-Arg; or (iii) at least one selected from dipeptides consisting of Pro-Pro, Pro-Ala, Pro-Lys, Pro-Ser, Pro-Val, Arg-Pro, Ser-Pro, Val-Pro, Arg-Gly, and Gly-Arg.

The composition for flavor modulating may further comprise at least one selected from dipeptides comprising glutamic acid (Glu) (glutamyl-dipeptides, for example, Glu-X, or X-Glu, wherein X is as defined above.).

In one embodiment, the composition for flavor modulating may further comprise at least one selected from glutamyl-dipeptides consisting of Glu-Ala, Ala-Glu, Glu-Arg, Arg-Glu, Glu-Asn, Asn-Glu, Glu-Asp, Asp-Glu, Glu-Cys, Cys-Glu, Glu-Gln, Gln-Glu, Glu-Glu, Glu-Gly, Gly-Glu, Glu-His, His-Glu, Glu-Ile, Ile-Glu, Glu-Leu, Leu-Glu, Glu-Lys, Lys-Glu, Glu-Met, Met-Glu, Glu-Phe, Phe-Glu, Glu-Pro, Pro-Glu, Glu-Ser, Ser-Glu, Glu-Thr, Thr-Glu, Glu-Trp, Trp-Glu, Glu-Val, Val-Glu, Glu-Tyr, and Tyr-Glu (that is, at least one selected from glutamyl-dipeptides).

As described above, the amino acid comprised in the composition for flavor modulating may be an L-amino acid or D-amino acid (for example, D-Pro-L-Pro, etc.). The glutamic acid comprised in the composition for flavor modulating may be a pyroglutamic acid form (for example, pyroGlu-Pro, pyroGlu-Glu, pyroGlu-Gln, pyroGlu-Ser, etc.). The glutamyl-dipeptide comprised in the composition for flavor modulating may be an α form or γ form.

In one specific embodiment, the composition for flavor modulating may further comprise at least one selected from glutamyl-dipeptides consisting of α-Glu-Ala, α-Glu-Gly, α-Glu-Ser, α-Glu-Val, α-Glu-The, α-Glu-Pro, α-Glu-Leu, α-Glu-Ile, α-Glu-Lys, α-Glu-Glu, α-Glu-Gin, α-Glu-His, α-Glu-Phe, α-Glu-Tyr, α-Glu-Asp, α-Glu-Arg, α-Glu-Trp, γ-Glu-Gly, γ-Glu-Ala, γ-Glu-Pro, γ-Glu-Val, γ-Glu-Ser, γ-Glu-Ile, γ-Glu-Thr, γ-Glu-Leu, γ-Glu-Asn, γ-Glu-Lys, γ-Glu-Glu, γ-Glu-His, γ-Glu-Trp, γ-Glu-Asp, γ-Glu-Tyr, γ-Glu-Arg, Ala-Glu, Asn-Glu, His-Glu, Asp-Glu, Phe-Glu, Tyr-Glu, Ile-Glu, Val-Glu, Ser-Glu, Pro-Glu, Thr-Glu, Met-Glu, and Leu-Glu.

In one embodiment, the composition for flavor modulating may further comprise at least one selected from glutamyl-dipeptides consisting of γ-Glu-Gly, γ-Glu-Glu, γ-Glu-Gln, γ-Glu-Leu, γ-Glu-Met, γ-Glu-His, γ-Glu-Ala, pyroGlu-Pro, pyroGlu-Glu, pyroGlu-Gln, and pyroGlu-Ser, and specifically, may further comprise at least one selected from glutamyl-dipeptides consisting of γ-Glu-Gly, γ-Glu-Leu, γ-Glu-Met, γ-Glu-His, pyroGlu-Glu, and pyroGlu-Gln, and further comprise at least one selected from glutamyl-dipeptides consisting of γ-Glu-Glu, γ-Glu-Gln, γ-Glu-Ala, pyroGlu-Pro, and pyroGlu-Ser.

In one embodiment, the composition for flavor modulating (i) may further comprise at least one selected from glutamyl-dipeptides consisting of γ-Glu-Gly, γ-Glu-Glu, γ-Glu-Gln, γ-Glu-Leu, γ-Glu-Met, γ-Glu-His, γ-Glu-Ala, pyroGlu-Pro, pyroGlu-Glu, and pyroGlu-Gln, or, (ii) may further comprise at least one selected from glutamyl-dipeptides consisting of γ-Glu-Gly, γ-Glu-Leu, γ-Glu-Met, γ-Glu-His, pyroGlu-Glu, pyroGlu-Gin, and pyroGlu-Ser.

In one embodiment, the composition for flavor modulating, may further comprise a pyroGlu-Ser glutamyl-dipeptide.

In one embodiment, the composition for flavor modulating, may comprise at least one (for example, 7 kinds or more, 8 kinds or more, 9 kinds or more, etc.) selected from dipeptides consisting of Pro-Pro, Pro-Val, Arg-Pro, Ser-Pro, Val-Pro, Arg-Gly, Gly-Arg, γ-Glu-Gly, γ-Glu-Leu, γ-Glu-Met, γ-Glu-His, pyroGlu-Glu, and pyroGlu-Gln, and may further comprise at least one selected from dipeptides consisting of Pro-Glu, Pro-Ala, Pro-Lys, Pro-Ser, Lys-Pro, γ-Glu-Glu, γ-Glu-Gln, γ-Glu-Ala, pyroGlu-Pro, pyroGlu-Ser.

In one embodiment, the composition for flavor modulating, may comprise (i) at least one selected from the group consisting of Pro-Pro, Pro-Glu, Pro-Ser, Pro-Val, Arg-Pro, Ser-Pro, Val-Pro, Arg-Gly, Gly-Arg, γ-Glu-Gly, γ-Glu-Glu, γ-Glu-Gln, γ-Glu-Leu, γ-Glu-Met, γ-Glu-His, γ-Glu-Ala, pyroGlu-Pro, pyroGlu-Glu, and pyroGlu-Gln, (ii) at least one selected from the group consisting of Pro-Pro, Pro-Ala, Pro-Lys, Pro-Ser, Pro-Val, Arg-Pro, Ser-Pro, Val-Pro, Arg-Gly, Gly-Arg, γ-Glu-Gly, γ-Glu-Leu, γ-Glu-Met, γ-Glu-His, pyroGlu-Glu, and pyroGlu-Gln, or (iii) at least one selected from the group consisting of Pro-Pro, Pro-Ala, Pro-Lys, Pro-Ser, Pro-Val, Arg-Pro, Ser-Pro, Val-Pro, Arg-Gly, Gly-Arg, γ-Glu-Gly, γ-Glu-Leu, γ-Glu-Met, γ-Glu-His, pyroGlu-Glu, pyroGlu-Gln, and pyroGlu-Ser.

Long Chain Peptide

Other aspect provides a composition for flavor modulating comprising a long chain peptide. Other aspect, provides a use of the long chain peptide for using in flavor modulating. Other aspect, provides a use of the long chain peptide for using in preparation of a composition for flavor modulating.

The long chain peptide may be at least one selected from polypeptides comprising the amino acid sequence of ALDPLPT (SEQ ID NO: 1), DGFP (SEQ ID NO: 2), DGML (SEQ ID NO: 3), DNEDTP (SEQ ID NO: 4), DTDEPN (SEQ ID NO: 5), EEL (SEQ ID NO: 6), EEV (SEQ ID NO: 7), EEY (SEQ ID NO: 8), ESLPALP (SEQ ID NO: 9), EVGYGY (SEQ ID NO: 10), LDYY (SEQ ID NO: 11), LPPP (SEQ ID NO: 12), MTTFTW (SEQ ID NO: 13), PPPP (SEQ ID NO: 14), PPPPP (SEQ ID NO: 15), DAPL (SEQ ID NO: 16), DVL (SEQ ID NO: 17), GGPF (SEQ ID NO: 18), GNPF (SEQ ID NO: 19), EVLK (SEQ ID NO: 20), FADSL (SEQ ID NO: 21), LAL (SEQ ID NO: 22), LLL (SEQ ID NO: 23), LLQ (SEQ ID NO: 24), LPL (SEQ ID NO: 25), PLL (SEQ ID NO: 26), TPL (SEQ ID NO: 27), and VLL (SEQ ID NO: 28).

The composition for flavor modulating may comprise at least one selected from long chain peptides comprising amino acid sequences of DGML (SEQ ID NO: 3), DNEDTP (SEQ ID NO: 4), LPPP (SEQ ID NO: 12), PPPP (SEQ ID NO: 14), PPPPP (SEQ ID NO: 15), DAPL (SEQ ID NO: 16), DVL (SEQ ID NO: 17), GGPF (SEQ ID NO: 18), LAL (SEQ ID NO: 22), LLL (SEQ ID NO: 23), PLL (SEQ ID NO: 26), and TPL (SEQ ID NO: 27), and further comprise at least one selected from long chain peptides comprising amino acid sequences of ALDPLPT (SEQ ID NO: 1), DGFP (SEQ ID NO: 2), EEL (SEQ ID NO: 6), EEV (SEQ ID NO: 7), EEY (SEQ ID NO: 8), ESLPALP (SEQ ID NO: 9), EVGYGY (SEQ ID NO: 10), LDYY (SEQ ID NO: 11), MTTFTW (SEQ ID NO: 13), EVLK (SEQ ID NO: 20), FADSL (SEQ ID NO: 21), LLQ (SEQ ID NO: 24), LPL (SEQ ID NO: 25), and VLL (SEQ ID NO: 28).

In one embodiment, the composition for flavor modulating may comprise (i) at least one selected from long chain peptides comprising amino acid sequences of ALDPLPT (SEQ ID NO: 1), DGML (SEQ ID NO: 3), DNEDTP (SEQ ID NO: 4), EEL (SEQ ID NO: 6), EEV (SEQ ID NO: 7), EEY (SEQ ID NO: 8), ESLPALP (SEQ ID NO: 9), EVGYGY (SEQ ID NO: 10), LDYY (SEQ ID NO: 11), LPPP (SEQ ID NO: 12), MTTFTW (SEQ ID NO: 13), PPPP (SEQ ID NO: 14), PPPPP (SEQ ID NO: 15), DAPL (SEQ ID NO: 16), DVL (SEQ ID NO: 17), GGPF (SEQ ID NO: 18), LAL (SEQ ID NO: 22), LLL (SEQ ID NO: 23), LLQ (SEQ ID NO: 24), PLL (SEQ ID NO: 26), and TPL (SEQ ID NO: 27);

(ii) at least one selected from long chain peptides comprising amino acid sequences of ALDPLPT (SEQ ID NO: 1), DGFP (SEQ ID NO: 2), DGML (SEQ ID NO: 3), DNEDTP (SEQ ID NO: 4), EEL (SEQ ID NO: 6), EEV (SEQ ID NO: 7), EEY (SEQ ID NO: 8), EVGYGY (SEQ ID NO: 10), LDYY (SEQ ID NO: 11), LPPP (SEQ ID NO: 12), MTTFTW (SEQ ID NO: 13), PPPP (SEQ ID NO: 14), PPPPP (SEQ ID NO: 15), DAPL (SEQ ID NO: 16), DVL (SEQ ID NO: 17), GGPF (SEQ ID NO: 18), LAL (SEQ ID NO: 22), LLL (SEQ ID NO: 23), PLL (SEQ ID NO: 26), and TPL (SEQ ID NO: 27), (iii) at least one selected from long chain peptides comprising amino acid sequences of DGML (SEQ ID NO: 3), DNEDTP (SEQ ID NO: 4), LPPP (SEQ ID NO: 12), PPPP (SEQ ID NO: 14), PPPPP (SEQ ID NO: 15), DAPL (SEQ ID NO: 16), DVL (SEQ ID NO: 17), GGPF (SEQ ID NO: 18), EVLK (SEQ ID NO: 20), LAL (SEQ ID NO: 22), LLL (SEQ ID NO: 23), LLQ (SEQ ID NO: 24), LPL (SEQ ID NO: 25), PLL (SEQ ID NO: 26), TPL (SEQ ID NO: 27), and VLL (SEQ ID NO: 28); or (iv) at least one selected from long chain peptides comprising amino acid sequences of DGFP (SEQ ID NO: 2), DGML (SEQ ID NO: 3), DNEDTP (SEQ ID NO: 4), LDYY (SEQ ID NO: 11), LPPP (SEQ ID NO: 12), PPPP (SEQ ID NO: 14), PPPPP (SEQ ID NO: 15), DAPL (SEQ ID NO: 16), DVL (SEQ ID NO: 17), GGPF (SEQ ID NO: 18), EVLK (SEQ ID NO: 20), FADSL (SEQ ID NO: 21), LAL (SEQ ID NO: 22), LLL (SEQ ID NO: 23), LLQ (SEQ ID NO: 24), LPL (SEQ ID NO: 25), PLL (SEQ ID NO: 26), TPL (SEQ ID NO: 27), and VLL (SEQ ID NO: 28).

Combination of Dipeptide and Long Chain Peptide

Other aspect provides a composition for flavor modulating, comprising the dipeptide and the long chain peptide. Other aspect provides a use of the dipeptide and the long chain peptide for suing in flavor modulating. Other aspect provides a use of the dipeptide and the long chain peptide for using in preparation of a composition for flavor modulating.

In one embodiment, the composition for flavor modulating, may comprise a combination of at least one selected from dipeptides of Table 1 below, and at least one selected from long chain peptides of Table 2 below:

TABLE 1

| No | Compound group | Dipeptide |
|---|---|---|
| 1 | Prolyl peptides | Pro-Ala |
| 2 | Prolyl peptides | Pro-Asn |
| 3 | Prolyl peptides | Pro-Glu |
| 4 | Prolyl peptides | Pro-Gln |
| 5 | Prolyl peptides | Pro-His |
| 6 | Prolyl peptides | Pro-Ile |
| 7 | Prolyl peptides | Pro-Leu |
| 8 | Prolyl peptides | Pro-Met |
| 9 | Prolyl peptides | Pro-Pro |
| 10 | Prolyl peptides | Pro-Phe |
| 11 | Prolyl peptides | Pro-Ser |
| 12 | Prolyl peptides | Pro-The |
| 13 | Prolyl peptides | Pro-Val |
| 14 | Prolyl peptides | Ala-Pro |
| 15 | Prolyl peptides | Pro-Gly |
| 16 | Prolyl peptides | Arg-Pro |
| 17 | Prolyl peptides | Asn-Pro |
| 18 | Prolyl peptides | Asp-Pro |
| 19 | Prolyl peptides | The-Pro |
| 20 | Prolyl peptides | His-Pro |
| 21 | Prolyl peptides | Ile-Pro |
| 22 | Prolyl peptides | Leu-Pro |
| 23 | Prolyl peptides | Ser-Pro |
| 24 | Prolyl peptides | Gly-Pro |
| 25 | Prolyl peptides | Tyr-Pro |
| 26 | Prolyl peptides | Val-Pro |
| 27 | Prolyl peptides | Glu-Pro |
| 28 | Prolyl peptides | Pro-Tyr |
| 29 | Prolyl peptides | Pro-Asp |
| 30 | Prolyl peptides | Pro-Cys |
| 31 | Prolyl peptides | Cys-Pro |
| 32 | Prolyl peptides | Gln-Pro |
| 33 | Prolyl peptides | Pro-Lys |
| 34 | Prolyl peptides | Lys-Pro |
| 35 | Prolyl peptides | Met-Pro |
| 36 | Prolyl peptides | Phe-Pro |
| 37 | Prolyl peptides | Pro-Trp |
| 38 | Prolyl peptides | Trp-Pro |
| 39 | Prolyl peptides | D-Pro-L-Pro |
| 40 | Arginyl peptides | Arg-Ala |
| 41 | Arginyl peptides | Arg-Gly |
| 42 | Arginyl peptides | Arg-Gln |
| 43 | Arginyl peptides | Gly-Arg |
| 44 | Arginyl peptides | Val-Arg |
| 45 | Arginyl peptides | Arg-Val |
| 46 | Arginyl peptides | Ala-Arg |
| 47 | Arginyl peptides | Pro-Arg |

TABLE 1-continued

| No | Compound group | Dipeptide |
|---|---|---|
| 48 | Arginyl peptides | Arg-Ser |
| 49 | Arginyl peptides | Asp-Arg |
| 50 | Arginyl peptides | Arg-Asp |
| 51 | Arginyl peptides | Arg-Leu |
| 52 | Arginyl peptides | Lys-Arg |
| 53 | Arginyl peptides | Glu-Arg |

TABLE 2

| No | Compound group | Long chain peptide | SEQ ID NO: |
|---|---|---|---|
| 1 | Long chain peptides | ALDPLPT | 1 |
| 2 | Long chain peptides | DGFP | 2 |
| 3 | Long chain peptides | DGML | 3 |
| 4 | Long chain peptides | DNEDTP | 4 |
| 5 | Long chain peptides | DTDEPN | 5 |
| 6 | Long chain peptides | EEL | 6 |
| 7 | Long chain peptides | EEV | 7 |
| 8 | Long chain peptides | EEY | 8 |
| 9 | Long chain peptides | ESLPALP | 9 |
| 10 | Long chain peptides | EVGYGY | 10 |
| 11 | Long chain peptides | LDYY | 11 |
| 12 | Long chain peptides | LPPP | 12 |
| 13 | Long chain peptides | MTTFTW | 13 |
| 14 | Long chain peptides | PPPP | 14 |
| 15 | Long chain peptides | PPPPP | 15 |
| 16 | Long chain peptides | DAPL | 16 |
| 17 | Long chain peptides | DVL | 17 |
| 18 | Long chain peptides | GGPF | 18 |
| 19 | Long chain peptides | GNPF | 19 |
| 20 | Long chain peptides | EVLK | 20 |
| 21 | Long chain peptides | FADSL | 21 |
| 22 | Long chain peptides | LAL | 22 |
| 23 | Long chain peptides | LLL | 23 |
| 24 | Long chain peptides | LLQ | 24 |
| 25 | Long chain peptides | LPL | 25 |
| 26 | Long chain peptides | PLL | 26 |
| 27 | Long chain peptides | TPL | 27 |
| 28 | Long chain peptides | VLL | 28 |

In one embodiment, the composition for flavor modulating, may comprise a combination of at least one selected from dipeptides of Table 3 below, and at least one selected from long chain peptides of Table 4 below:

TABLE 3

| No | Dipeptide |
|---|---|
| 1 | L-prolyl-L-alanine, Pro-Ala |
| 2 | L-alanyl-L-proline, Ala-Pro |
| 3 | L-prolyl-L-arginine, Pro-Arg |
| 4 | L-arginyl-L-proline, Arg-Pro |
| 5 | L-prolyl-L-asparagine, Pro-Asn |
| 6 | L-asparaginyl-L-proline, Asn-Pro |
| 7 | L-prolyl-L-aspartic acid, Pro-Asp |
| 8 | L-aspartyl-L-proline, Asp-Pro |
| 9 | L-prolyl-L-cysteine, Pro-Cys |
| 10 | L-cysteinyl-L-proline, Cys-Pro |
| 11 | L-prolyl-L-glutamine, Pro-Gln |
| 12 | L-glutaminyl-proline, Gln-Pro |
| 13 | L-prolyl-L-glutamic acid, Pro-Glu |
| 14 | L-glutamyl-L-proline, Glu-Pro |
| 15 | L-prolyl-L-glycine, Pro-Gly |
| 16 | L-glycyl-L-proline, Gly-Pro |
| 17 | L-prolyl-L-histidine, Pro-His |
| 18 | L-histidyl-L-proline, His-Pro |
| 19 | L-prolyl-L-isoleucine, Pro-Ile |
| 20 | L-isoleucyl-L-proline, Ile-Pro |
| 21 | L-prolyl-L-leucine, Pro-Leu |
| 22 | L-leucyl-L-proline, Leu-Pro |
| 23 | L-prolyl-L-lysine, Pro-Lys |
| 24 | L-lysyl-L-proline, Lys-Pro |
| 25 | L-prolyl-L-methionine, Pro-Met |
| 26 | L-methionyl-L-proline, Met-Pro |
| 27 | L-prolyl-L-phenylalanine, Pro-Phe |
| 28 | L-phenylalanyl-L-proline, Phe-Pro |
| 29 | L-prolyl-L-proline, Pro-Pro |
| 30 | L-prolyl-L-serine, Pro-Ser |
| 31 | L-seryl-L-proline, Ser-Pro |
| 32 | L-prolyl-L-threonine, Pro-Thr |
| 33 | L-threonyl-L-proline, Thr-Pro |
| 34 | L-prolyl-L-tryptophane, Pro-Trp |
| 35 | L-tryptophyl-L-proline, Trp-Pro |
| 36 | L-prolyl-L-tyrosine, Pro-Tyr |
| 37 | L-tyrosyl-L-proline, Tyr-Pro |
| 38 | L-prolyl-L-valine, Pro-Val |
| 39 | L-valyl-L-proline, Val-Pro |
| 40 | D-Pro-L-Pro |
| 41 | Gly-Arg |
| 42 | Arg-Gly |

TABLE 4

| No | Long chain peptide | SEQ ID NO: |
|---|---|---|
| 1 | ALDPLPT | 1 |
| 2 | DGFP | 2 |
| 3 | DGML | 3 |
| 4 | DNEDTP | 4 |
| 5 | EEL | 6 |
| 6 | EEV | 7 |
| 7 | EEY | 8 |
| 8 | ESLPALP | 9 |
| 9 | EVGYGY | 10 |
| 10 | LDYY | 11 |
| 11 | LPPP | 12 |
| 12 | MTTFTW | 13 |
| 13 | PPPP | 14 |
| 14 | PPPPP | 15 |
| 15 | DAPL | 16 |
| 16 | DVL | 17 |
| 17 | GGPF | 18 |
| 18 | EVLK | 20 |
| 19 | FADSL | 21 |
| 20 | LAL | 22 |
| 21 | LLL | 23 |
| 22 | LLQ | 24 |
| 23 | LPL | 25 |
| 24 | PLL | 26 |
| 25 | TPL | 27 |
| 26 | VLL | 28 |

As described above, the dipeptide comprised in the composition for flavor modulating may further comprise a glutamyl-dipeptide, specifically, at least one selected from glutamyl-dipeptides consisting of α-Glu-Ala, α-Glu-Gly, α-Glu-Ser, α-Glu-Val, α-Glu-The, α-Glu-Pro, α-Glu-Leu, α-Glu-Ile, α-Glu-Lys, α-Glu-Glu, α-Glu-Gin, α-Glu-His, α-Glu-Phe, α-Glu-Tyr, α-Glu-Asp, α-Glu-Arg, α-Glu-Trp, γ-Glu-Gly, γ-Glu-Ala, γ-Glu-Pro, γ-Glu-Val, γ-Glu-Ser, γ-Glu-Ile, γ-Glu-Thr, γ-Glu-Leu, γ-Glu-Asn, γ-Glu-Lys, γ-Glu-Glu, γ-Glu-His, γ-Glu-Trp, γ-Glu-Asp, γ-Glu-Tyr, γ-Glu-Arg, Ala-Glu, Asn-Glu, His-Glu, Asp-Glu, Phe-Glu, Tyr-Glu, Ile-Glu, Val-Glu, Ser-Glu, Pro-Glu, Thr-Glu, Met-Glu, and Leu-Glu. The description of the glutamyl-dipeptide is as described above.

In one embodiment, the composition for flavor modulating, may comprise (i) a dipeptide comprising at least one (for example, 7 kinds or more, 8 kinds or more, 9 kinds or more, etc.) selected from dipeptides consisting of Pro-Pro, Pro-Val, Arg-Pro, Ser-Pro, Val-Pro, Arg-Gly, Gly-Arg, γ-Glu-Gly, γ-Glu-Leu, γ-Glu-Met, γ-Glu-His, pyroGlu-Glu, and pyroGlu-Gln; and (ii) a long chain peptide comprising at least one selected from polypeptides comprising amino acid sequences of DGML (SEQ ID NO: 3), DNEDTP (SEQ ID NO: 4), LPPP (SEQ ID NO: 12), PPPP (SEQ ID NO: 14), PPPPP (SEQ ID NO: 15), DAPL (SEQ ID NO: 16), DVL (SEQ ID NO: 17), GGPF (SEQ ID NO: 18), LAL (SEQ ID NO: 22), LLL (SEQ ID NO: 23), PLL (SEQ ID NO: 26), and TPL (SEQ ID NO: 27).

In one embodiment, the composition for flavor modulating, may further comprise (i) at least one selected from dipeptides consisting of Pro-Glu, Pro-Ala, Pro-Lys, Pro-Ser, Lys-Pro, γ-Glu-Glu, γ-Glu-Gln, γ-Glu-Ala, pyroGlu-Pro, pyroGlu-Ser; and/or at least one selected from polypeptides comprising amino acid sequences of ALDPLPT (SEQ ID NO: 1), DGFP (SEQ ID NO: 2), EEL (SEQ ID NO: 6), EEV (SEQ ID NO: 7), EEY (SEQ ID NO: 8), ESLPALP (SEQ ID NO: 9), EVGYGY (SEQ ID NO: 10), LDYY (SEQ ID NO: 11), MTTFTW (SEQ ID NO: 13), EVLK (SEQ ID NO: 20), FADSL (SEQ ID NO: 21), LLQ (SEQ ID NO: 24), LPL (SEQ ID NO: 25), and VLL (SEQ ID NO: 28).

In other words, in one embodiment, the composition for flavor modulating, may comprise (i) at least one dipeptide selected from the group consisting of Arg-Ala, Ala-Arg, Arg-Asp, Asp-Arg, Arg-Gln, Gln-Arg, Arg-Gly, Gly-Arg, Arg-Leu, Leu-Arg, Arg-Lys, Lys-Arg, Arg-Pro, Pro-Arg, Arg-Ser, Ser-Arg, Arg-Val, Val-Arg, Pro-Ala, Ala-Pro, Pro-Arg, Arg-Pro, Pro-Asn, Asn-Pro, Pro-Asp, Asp-Pro, Pro-Cys, Cys-Pro, Pro-Gln, Gln-Pro, Pro-Gly, Gly-Pro, Pro-His, His-Pro, Pro-Ile, Ile-Pro, Pro-Leu, Leu-Pro, Pro-Lys, Lys-Pro, Pro-Met, Met-Pro, Pro-Phe, Phe-Pro, Pro-Pro, Pro-Ser, Ser-Pro, Pro-Thr, Thr-Pro, Pro-Trp, Trp-Pro, Pro-Val, Val-Pro, Pro-Tyr, and Tyr-Pro, and/or (ii) at least one selected from long chain peptides comprising amino acid sequences of ALDPLPT (SEQ ID NO: 1), DGFP (SEQ ID NO: 2), DGML (SEQ ID NO: 3), DNEDTP (SEQ ID NO: 4), DTDEPN (SEQ ID NO: 5), EEL (SEQ ID NO: 6), EEV (SEQ ID NO: 7), EEY (SEQ ID NO: 8), ESLPALP (SEQ ID NO: 9), EVGYGY (SEQ ID NO: 10), LDYY (SEQ ID NO: 11), LPPP (SEQ ID NO: 12), MTTFTW (SEQ ID NO: 13), PPPP (SEQ ID NO: 14), PPPPP (SEQ ID NO: 15), DAPL (SEQ ID NO: 16), DVL (SEQ ID NO: 17), GGPF (SEQ ID NO: 18), GNPF (SEQ ID NO: 19), EVLK (SEQ ID NO: 20), FADSL (SEQ ID NO: 21), LAL (SEQ ID NO: 22), LLL (SEQ ID NO: 23), LLQ (SEQ ID NO: 24), LPL (SEQ ID NO: 25), PLL (SEQ ID NO: 26), TPL (SEQ ID NO: 27), and VLL (SEQ ID NO: 28).

In one embodiment, the composition for flavor modulating, may comprise (i) at least one dipeptide selected from the group consisting of Arg-Gly, Gly-Arg, Pro-Pro, Pro-Glu, Pro-Ala, Pro-Lys, Pro-Ser, Pro-Val, Arg-Pro, Lys-Pro, Ser-Pro, and Val-Pro, and/or (ii) at least one selected from long chain peptides comprising amino acid sequences of ALDPLPT (SEQ ID NO: 1), DGFP (SEQ ID NO: 2), DGML (SEQ ID NO: 3), DNEDTP (SEQ ID NO: 4), EEL (SEQ ID NO: 6), EEV (SEQ ID NO: 7), EEY (SEQ ID NO: 8), ESLPALP (SEQ ID NO: 9), EVGYGY (SEQ ID NO: 10), LDYY (SEQ ID NO: 11), LPPP (SEQ ID NO: 12), MTTFTW (SEQ ID NO: 13), PPPP (SEQ ID NO: 14), PPPPP (SEQ ID NO: 15), DAPL (SEQ ID NO: 16), DVL (SEQ ID NO: 17), GGPF (SEQ ID NO: 18), EVLK (SEQ ID NO: 20), FADSL (SEQ ID NO: 21), LAL (SEQ ID NO: 22), LLL (SEQ ID NO: 23), LLQ (SEQ ID NO: 24), LPL (SEQ ID NO: 25), PLL (SEQ ID NO: 26), TPL (SEQ ID NO: 27), and VLL (SEQ ID NO: 28).

In one embodiment, the composition for flavor modulating, may comprise (i) at least one selected from dipeptides consisting of Pro-Pro, Pro-Val, Arg-Pro, Ser-Pro, Val-Pro, Arg-Gly, and Gly-Arg, and/or (ii) at least one selected from long chain peptides comprising amino acid sequences of DGML (SEQ ID NO: 3), DNEDTP (SEQ ID NO: 4), LPPP (SEQ ID NO: 12), PPPP (SEQ ID NO: 14), PPPPP (SEQ ID NO: 15), DAPL (SEQ ID NO: 16), DVL (SEQ ID NO: 17), GGPF (SEQ ID NO: 18), LAL (SEQ ID NO: 22), LLL (SEQ ID NO: 23), PLL (SEQ ID NO: 26), and TPL (SEQ ID NO: 27).

In one embodiment, the composition for flavor modulating, may further comprise (i) at least one selected from dipeptides consisting of Pro-Glu, Pro-Ala, Pro-Lys, Pro-Ser, and Lys-Pro, and/or (ii) at least one selected from long chain peptides comprising amino acid sequences of ALDPLPT (SEQ ID NO: 1), DGFP (SEQ ID NO: 2), EEL (SEQ ID NO: 6), EEV (SEQ ID NO: 7), EEY (SEQ ID NO: 8), ESLPALP (SEQ ID NO: 9), EVGYGY (SEQ ID NO: 10), LDYY (SEQ ID NO: 11), MTTFTW (SEQ ID NO: 13), EVLK (SEQ ID NO: 20), FADSL (SEQ ID NO: 21), LLQ (SEQ ID NO: 24), LPL (SEQ ID NO: 25), and VLL (SEQ ID NO: 28).

In one embodiment, the composition for flavor modulating, may comprise (1) (i) at least one selected from dipeptides consisting of Pro-Pro, Pro-Glu, Pro-Ser, Pro-Val, Arg-Pro, Ser-Pro, Val-Pro, Arg-Gly, and Gly-Arg and (ii) at least one selected from long chain peptides comprising amino acid sequences of ALDPLPT (SEQ ID NO: 1), DGML (SEQ ID NO: 3), DNEDTP (SEQ ID NO: 4), EEL (SEQ ID NO: 6), EEV (SEQ ID NO: 7), EEY (SEQ ID NO: 8), ESLPALP (SEQ ID NO: 9), EVGYGY (SEQ ID NO: 10), LDYY (SEQ ID NO: 11), LPPP (SEQ ID NO: 12), MTTFTW (SEQ ID NO: 13), PPPP (SEQ ID NO: 14), PPPPP (SEQ ID NO: 15), DAPL (SEQ ID NO: 16), DVL (SEQ ID NO: 17), GGPF (SEQ ID NO: 18), LAL (SEQ ID NO: 22), LLL (SEQ ID NO: 23), LLQ (SEQ ID NO: 24), PLL (SEQ ID NO: 26), and TPL (SEQ ID NO: 27);

(2) (i) at least one selected from dipeptides consisting of Pro-Pro, Pro-Glu, Pro-Ser, Pro-Val, Arg-Pro, Ser-Pro, Val-Pro, Arg-Gly, and Gly-Arg and (ii) at least one selected from long chain peptides comprising amino acid sequences of ALDPLPT (SEQ ID NO: 1), DGFP (SEQ ID NO: 2), DGML (SEQ ID NO: 3), DNEDTP (SEQ ID NO: 4), EEL (SEQ ID NO: 6), EEV (SEQ ID NO: 7), EEY (SEQ ID NO: 8), EVGYGY (SEQ ID NO: 10), LDYY (SEQ ID NO: 11), LPPP (SEQ ID NO: 12), MTTFTW (SEQ ID NO: 13), PPPP (SEQ ID NO: 14), PPPPP (SEQ ID NO: 15), DAPL (SEQ ID NO: 16), DVL (SEQ ID NO: 17), GGPF (SEQ ID NO: 18), LAL (SEQ ID NO: 22), LLL (SEQ ID NO: 23), PLL (SEQ ID NO: 26), and TPL (SEQ ID NO: 27);

(3) (i) at least one selected from dipeptides consisting of Pro-Pro, Pro-Ala, Pro-Lys, Pro-Val, Arg-Pro, Ser-Pro, Val-Pro, Arg-Gly, and Gly-Arg and (ii) at least one selected from long chain peptides comprising amino acid sequences of DGML (SEQ ID NO: 3), DNEDTP (SEQ ID NO: 4), LPPP (SEQ ID NO: 12), PPPP (SEQ ID NO: 14), PPPPP (SEQ ID NO: 15), DAPL (SEQ ID NO: 16), DVL (SEQ ID NO: 17), GGPF (SEQ ID NO: 18), EVLK (SEQ ID NO: 20), LAL (SEQ ID NO: 22), LLL (SEQ ID NO: 23), LLQ (SEQ ID NO: 24), LPL (SEQ ID NO: 25), PLL (SEQ ID NO: 26), TPL (SEQ ID NO: 27), and VLL (SEQ ID NO: 28); or (4) (i) at least one selected from dipeptides consisting of Pro-Pro, Pro-Ala, Pro-Lys, Pro-Ser, Pro-Val, Arg-Pro, Ser-Pro, Val-Pro, Arg-Gly, and Gly-Arg and (ii) at least one selected from long chain peptides comprising amino acid sequences of DGFP (SEQ ID NO: 2), DGML (SEQ ID NO: 3), DNEDTP (SEQ ID NO: 4), LDYY (SEQ ID NO: 11), LPPP (SEQ ID NO: 12), PPPP (SEQ ID NO: 14), PPPPP (SEQ ID NO: 15), DAPL (SEQ ID NO: 16), DVL (SEQ ID NO: 17), GGPF (SEQ ID NO: 18), EVLK (SEQ ID NO: 20), FADSL (SEQ ID NO: 21), LAL (SEQ ID NO: 22), LLL (SEQ ID NO: 23), LLQ (SEQ ID NO: 24), LPL (SEQ ID NO: 25), PLL (SEQ ID NO: 26), TPL (SEQ ID NO: 27), and VLL (SEQ ID NO: 28).

In one specific embodiment, the composition for flavor modulating, may comprise (1) long chain peptides comprising amino acid sequences of Pro-Pro, Pro-Glu, Pro-Ser, Pro-Val, Arg-Pro, Ser-Pro, Val-Pro, Arg-Gly, Gly-Arg, γ-Glu-Gly, γ-Glu-Glu, γ-Glu-Gln, γ-Glu-Leu, γ-Glu-Met, γ-Glu-His, γ-Glu-Ala, pyroGlu-Pro, pyroGlu-Glu, pyroGlu-Gln, and ALDPLPT (SEQ ID NO: 1), DGML (SEQ ID NO: 3), DNEDTP (SEQ ID NO: 4), EEL (SEQ ID NO: 6), EEV (SEQ ID NO: 7), EEY (SEQ ID NO: 8), ESLPALP (SEQ ID NO: 9), EVGYGY (SEQ ID NO: 10), LDYY (SEQ ID NO: 11), LPPP (SEQ ID NO: 12), MTTFTW (SEQ ID NO: 13), PPPP (SEQ ID NO: 14), PPPPP (SEQ ID NO: 15), DAPL (SEQ ID NO: 16), DVL (SEQ ID NO: 17), GGPF (SEQ ID NO: 18), LAL (SEQ ID NO: 22), LLL (SEQ ID NO: 23), LLQ (SEQ ID NO: 24), PLL (SEQ ID NO: 26), and TPL (SEQ ID NO: 27);

(2) long chain peptides comprising amino acid sequences of Pro-Pro, Pro-Glu, Pro-Ser, Pro-Val, Arg-Pro, Ser-Pro, Val-Pro, Arg-Gly, Gly-Arg, γ-Glu-Gly, γ-Glu-Glu, γ-Glu-Gln, γ-Glu-Leu, γ-Glu-Met, γ-Glu-His, γ-Glu-Ala, pyroGlu-Pro, pyroGlu-Glu, pyroGlu-Gln, and ALDPLPT (SEQ ID NO: 1), DGFP (SEQ ID NO: 2), DGML (SEQ ID NO: 3), DNEDTP (SEQ ID NO: 4), EEL (SEQ ID NO: 6), EEV (SEQ ID NO: 7), EEY (SEQ ID NO: 8), EVGYGY (SEQ ID NO: 10), LDYY (SEQ ID NO: 11), LPPP (SEQ ID NO: 12), MTTFTW (SEQ ID NO: 13), PPPP (SEQ ID NO: 14), PPPPP (SEQ ID NO: 15), DAPL (SEQ ID NO: 16), DVL (SEQ ID NO: 17), GGPF (SEQ ID NO: 18), LAL (SEQ ID NO: 22), LLL (SEQ ID NO: 23), PLL (SEQ ID NO: 26), and TPL (SEQ ID NO: 27);

(3) long chain peptides comprising amino acid sequences of Pro-Pro, Pro-Ala, Pro-Lys, Pro-Ser, Pro-Val, Arg-Pro, Ser-Pro, Val-Pro, Arg-Gly, Gly-Arg, γ-Glu-Gly, γ-Glu-Leu, γ-Glu-Met, γ-Glu-His, pyroGlu-Glu, pyroGlu-Gin, and DGML (SEQ ID NO: 3), DNEDTP (SEQ ID NO: 4), LPPP (SEQ ID NO: 12), PPPP (SEQ ID NO: 14), PPPPP (SEQ ID NO: 15), DAPL (SEQ ID NO: 16), DVL (SEQ ID NO: 17), GGPF (SEQ ID NO: 18), EVLK (SEQ ID NO: 20), LAL (SEQ ID NO: 22), LLL (SEQ ID NO: 23), LLQ (SEQ ID NO: 24), LPL (SEQ ID NO: 25), PLL (SEQ ID NO: 26), TPL (SEQ ID NO: 27), and VLL (SEQ ID NO: 28); or (4) long chain peptides comprising amino acid sequences of Pro-Pro, Pro-Ala, Pro-Lys, Pro-Ser, Pro-Val, Arg-Pro, Ser-Pro, Val-Pro, Arg-Gly, Gly-Arg, γ-Glu-Gly, γ-Glu-Leu, γ-Glu-Met, γ-Glu-His, pyroGlu-Glu, pyroGlu-Gln, pyroGlu-Ser, and DGFP (SEQ ID NO: 2), DGML (SEQ ID NO: 3), DNEDTP (SEQ ID NO: 4), LDYY (SEQ ID NO: 11), LPPP (SEQ ID NO: 12), PPPP (SEQ ID NO: 14), PPPPP (SEQ ID NO: 15), DAPL (SEQ ID NO: 16), DVL (SEQ ID NO: 17), GGPF (SEQ ID NO: 18), EVLK (SEQ ID NO: 20), FADSL (SEQ ID NO: 21), LAL (SEQ ID NO: 22), LLL (SEQ ID NO: 23), LLQ (SEQ ID NO: 24), LPL (SEQ ID NO: 25), PLL (SEQ ID NO: 26), TPL (SEQ ID NO: 27), and VLL (SEQ ID NO: 28).

In the present description, when at least two kinds of the dipeptide, long chain peptide and combination thereof are mixed and used, each mixing ratio (for example, molarity) may be appropriately mixed and used according to a desired purpose.

In one specific embodiment, when at least two of the dipeptide compounds are used in combination, when the molarity of the dipeptide γ-Glu-Met is set to 1, the ratio between the dipeptide compounds may be same as described in Table 5, but not limited thereto.

In one specific embodiment, when at least two of the long chain peptide compounds are used in combination, when the molarity of the long chain peptide LLL (SEQ ID NO: 23) is set to 1, the ratio between the long chain peptide compounds may be same as described in Table 6 below, but not limited thereto.

TABLE 5

| No | Dipeptide | Molar ratio {Molarity of the other dipeptide shown when the molarity of the dipeptide γ-Glu-Met is set to 1} |
|---|---|---|
| 1 | γ-Glu-Gly | 4 to 70, for example, 4.5, 5.3, or 70.0, etc. |
| 2 | γ-Glu-Glu | 4 to 15, for example, 4.5 or 11.7, etc. |
| 3 | γ-Glu-Gln | 1 to 10, for example, 1.4, or 9.0, etc. |
| 4 | γ-Glu-Leu | 2 to 25, for example, 2.0, 14.8, or 20.9, etc. |
| 5 | γ-Glu-Met | 1 |
| 6 | γ-Glu-His | 1 to 40, for example, 1.6, 2.2, or 40.0, etc. |
| 7 | γ-Glu-Ala | 5 to 20, for example, 5.5 or 18.9, etc. |
| 8 | pyroGlu-Pro | 70 to 350, for example, 79.1 or 336.4, etc. |
| 9 | pyroGlu-Glu | 20 to 100, for example, 23.8, 26.0, 47.4, or 98.0, etc. |

TABLE 5-continued

| No | Dipeptide | Molar ratio {Molarity of the other dipeptide shown when the molarity of the dipeptide γ-Glu-Met is set to 1} |
|---|---|---|
| 10 | pyroGlu-Gln | 5 to 150, for example, 9.6, 10.0, 20.0, or 123.0, etc. |
| 11 | pyroGlu-Ser | 20 to 40, for example, 26.0, etc. |
| 12 | Pro-Pro | 10 to 70, for example, 16.9, 35.0, 63.9, or 68.0, etc. |
| 13 | Pro-Glu | 10 to 40, for example, 15.4 or 37.9, etc. |
| 14 | Pro-Ala | 40 to 170, for example, 44.0 or 164.0, etc. |
| 15 | Pro-Lys | 20 to 25, for example, 23.0 or 24.0, etc. |
| 16 | Pro-Ser | 4 to 360, for example, 4.6, 17.7, or 78.0, etc. |
| 17 | Pro-Val | 3 to 120, for example, 3.7, 10.4, 26.0, or 110.0, etc. |
| 18 | Arg-Pro | 0.5 to 120, for example, 0.8, 10.7, 35.0, or 110.0, etc. |
| 19 | Lys-Pro | 25 to 30, for example, 27.0, etc. |
| 20 | Ser-Pro | 5 to 360, for example, 8.3, 36.1, 207.0, or 356.0, etc. |
| 21 | Val-Pro | 5 to 140, for example, 6.1, 43.3, 84.0, or 139.0, etc. |
| 22 | Arg-Gly | 0.1 to 60, for example, 0.2, 1.4, 42.0, or 57.0, etc. |
| 23 | Gly-Arg | 0.5 to 200, for example, 0.9, 2.3, 114.0, or 198.0, etc. |
| 24 | Pro-Ala | 40 to 170, for example, 44.0 or 164.0, etc. |

TABLE 6

| No | Long chain peptide | Molar ratio {Molarity of the other long chain peptide shown when the molarity of the long chain peptide LLL is set to 1} |
|---|---|---|
| 1 | ALDPLPT | 1 to 10, for example, 3.0 or 9.7, etc. |
| 2 | DGFP | 1 to 5, for example, 1.0 or 4.5, etc. |
| 3 | DGML | 1 to 500, for example, 3.0, 8.5, 13.0, or 445.5, etc. |
| 4 | DNEDTP | 0.5 to 120, for example, 0.6, 55.5, 58.5, 117.0, etc. |
| 5 | EEL | 30 to 150, for example, 31.83 or 145.0, etc. |
| 6 | EEV | 20 to 160, for example, 22.8, 152.5, etc. |
| 7 | EEY | 5 to 35, for example, 5.8 or 32.0, etc. |
| 8 | ESLPALP | 1 to 10, for example, 8.7, etc. |
| 9 | EVGYGY | 1 to 15, for example, 4.0 or 12.8, etc. |
| 10 | LDYY | 1 to 60, for example, 1.3, 30.0, or 58.7, etc. |
| 11 | LPPP | 10 to 70, for example, 15.0, 31.2, 35.0, or 67.0, etc. |
| 12 | MTTFTW | 20 to 40, for example, 20.5 or 32.5, etc. |
| 13 | PPPP | 1 to 170, for example, 2.0, 10.0, 28.3, or 166.5, etc. |
| 14 | PPPPP | 0.1 to 40, for example, 0.6, 4.0, 18.0, or 30.5, etc. |
| 15 | DAPL | 0.1 to 25, for example, 0.5, 1.0, 9.0, or 23.0, etc. |
| 16 | DVL | 5 to 100, for example, 9.0, 33.0, 35.5, or 96.0, etc. |
| 17 | GGPF | 0.1 to 10, for example, 0.5, 0.67, 2.0, or 6.0, etc. |
| 18 | EVLK | 5 to 100, for example, 9.0 or 90.0, etc. |
| 19 | FADSL | 0.0001 to 0.01, for example, 0.001, etc. |
| 20 | LAL | 1 to 70, for example, 2.0, 3.5, or 60.0, etc. |
| 21 | LLL | 1 |
| 22 | LLQ | 0.1 to 15, for example, 0.5, 8.0, or 14.0, etc. |
| 23 | LPL | 1 to 30, for example, 3.0 or 20.0, etc. |
| 24 | PLL | 1 to 10, for example, 1.5, 4.5, 3.0, or 6.0, etc. |
| 25 | TPL | 5 to 200, for example, 6.5, 7.5, 15.0, or 190.0, etc. |
| 26 | VLL | 1 to 10, for example, 4.0 or 5.0, etc. |

In one embodiment, the composition for flavor modulating, 1) may comprise at least one (for example, 11 kinds or more, 12 kinds or more, or all, etc.) selected from dipeptides of Table 7 below, at least one (for example, 11 kinds or more, 12 kinds or more, or all, etc.) selected from long chain peptides of Table 8 below, or a combination thereof, or
2) comprise at least one (for example, 11 kinds or more, 12 kinds or more, or all, etc.) selected from dipeptides of Table 9 below, at least one selected from long chain peptides of Table 10 below, or a combination thereof, or
3) comprise at least one (for example, 7 kinds or more, 8 kinds or more, or all, etc.) selected from dipeptides of Table 11 below, at least one selected from long chain peptides of Table 12 below, or a combination thereof, or
4) comprise at least one (for example, 8 kinds or more, 9 kinds or more, or all, etc.) selected from dipeptides of Table 13 below, at least one selected from long chain peptides of Table 14 below, or a combination thereof.

In one embodiment, when at least two of the dipeptide compounds in any one of 1) to 4) above are used in combination, when the molarity of the dipeptide γ-Glu-Met is set to 1, the ratio between the dipeptide compounds may be same as described in Table 7, Table 9, Table 11 or Table 13, respectively, but not limited thereto.

In one embodiment, when at least two of the long chain peptide compounds in any one of 1) to 4) above are used in combination, when the molarity of the long chain peptide LLL is set to 1, the ratio between the long chain peptide compounds may be same as described in Table 8, Table 10, Table 12 or Table 14, respectively, but not limited thereto.

TABLE 7

| No | Dipeptide | Molar ratio {Molarity of the other dipeptide shown when the molarity of the dipeptide γ-Glu-Met is set to 1} |
|---|---|---|
| 1 | γ-Glu-Gly | 4 to 70, for example, 4.5, 5.3, or 70.0, etc. |
| 2 | γ-Glu-Glu | 4 to 15, for example, 4.5 or 11.7, etc. |
| 3 | γ-Glu-Gln | 1 to 10, for example, 1.4, or 9.0, etc. |
| 4 | γ-Glu-Leu | 2 to 25, for example, 2.0, 14.8, or 20.9, etc. |
| 5 | γ-Glu-Met | 1 |
| 6 | γ-Glu-His | 1 to 40, for example, 1.6, 2.2, or 40.0, etc. |
| 7 | γ-Glu-Ala | 5 to 20, for example, 5.5 or 18.9, etc. |
| 8 | pyroGlu-Pro | 70 to 350, for example, 79.1 or 336.4, etc. |
| 9 | pyroGlu-Glu | 20 to 100, for example, 23.8, 26.0, 47.4, or 98.0, etc. |
| 10 | pyroGlu-Gln | 5 to 150, for example, 9.6, 10.0, 20.0, or 123.0, etc. |
| 11 | Pro-Pro | 10 to 70, for example, 16.9, 35.0, 63.9, or 68.0, etc. |
| 12 | Pro-Glu | 10 to 40, for example, 15.4 or 37.9, etc. |
| 13 | Pro-Ser | 4 to 360, for example, 4.6, 17.7, or 78.0, etc. |
| 14 | Pro-Val | 3 to 120, for example, 3.7, 10.4, 26.0, or 110.0, etc. |
| 15 | Arg-Pro | 0.5 to 120, for example, 0.8, 10.7, 35.0, or 110.0, etc. |
| 16 | Ser-Pro | 5 to 360, for example, 8.3, 36.1, 207.0, or 356.0, etc. |
| 17 | Val-Pro | 5 to 140, for example, 6.1, 43.3, 84.0, or 139.0, etc. |
| 18 | Arg-Gly | 0.1 to 60, for example, 0.2, 1.4, 42.0, or 57.0, etc. |
| 19 | Gly-Arg | 0.5 to 200, for example, 0.9, 2.3, 114.0, or 198.0, etc. |

TABLE 8

| No | Long chain peptide | Molar ratio {Molarity of the other long chain peptide shown when the molarity of the long chain peptide LLL is set to 1} |
|---|---|---|
| 1 | ALDPLPT | 1 to 10, for example, 3.0 or 9.7, etc. |
| 2 | DGML | 1 to 500, for example, 3.0, 8.5, 13.0, or 445.5, etc. |
| 3 | DNEDTP | 0.5 to 120, for example, 0.6, 55.5, 58.5, 117.0, etc. |
| 4 | EEL | 30 to 150, for example, 31.83 or 145.0, etc. |
| 5 | EEV | 20 to 160, for example, 22.8, 152.5, etc. |
| 6 | EEY | 5 to 35, for example, 5.8 or 32.0, etc. |
| 7 | ESLPALP | 1 to 10, for example, 8.7, etc. |
| 8 | EVGYGY | 1 to 15, for example, 4.0 or 12.8, etc. |
| 9 | LDYY | 1 to 60, for example, 1.3, 30.0, or 58.7, etc. |
| 10 | LPPP | 10 to 70, for example, 15.0, 31.2, 35.0, or 67.0, etc. |
| 11 | MTTFTW | 20 to 40, for example, 20.5 or 32.5, etc. |
| 12 | PPPP | 1 to 170, for example, 2.0, 10.0, 28.3, or 166.5, etc. |
| 13 | PPPPP | 0.1 to 40, for example, 0.6, 4.0, 18.0, or 30.5, etc. |
| 14 | DAPL | 0.1 to 25, for example, 0.5, 1.0, 9.0, or 23.0, etc. |
| 15 | DVL | 5 to 100, for example, 9.0, 33.0, 35.5, or 96.0, etc. |
| 16 | GGPF | 0.1 to 10, for example, 0.5, 0.67, 2.0, or 6.0, etc. |
| 17 | LAL | 1 to 70, for example, 2.0, 3.5, or 60.0, etc. |
| 18 | LLL | 1 |
| 19 | LLQ | 0.1 to 15, for example, 0.5, 8.0, or 14.0, etc. |
| 20 | PLL | 1 to 10, for example, 1.5, 4.5, 3.0, or 6.0, etc. |
| 21 | TPL | 5 to 200, for example, 6.5, 7.5, 15.0, or 190.0, etc. |

TABLE 9

| No | Dipeptide | Molar ratio {Molarity of the other dipeptide shown when the molarity of the dipeptide γ-Glu-Met is set to 1} |
|---|---|---|
| 1 | γ-Glu-Gly | 4 to 70, for example, 4.5, 5.3, or 70.0, etc. |
| 2 | γ-Glu-Glu | 4 to 15, for example, 4.5 or 11.7, etc. |
| 3 | γ-Glu-Gln | 1 to 10, for example, 1.4, or 9.0, etc. |
| 4 | γ-Glu-Leu | 2 to 25, for example, 2.0, 14.8, or 20.9, etc. |
| 5 | γ-Glu-Met | 1 |
| 6 | γ-Glu-His | 1 to 40, for example, 1.6, 2.2, or 40.0, etc. |
| 7 | γ-Glu-Ala | 5 to 20, for example, 5.5 or 18.9, etc. |
| 8 | pyroGlu-Pro | 70 to 350, for example, 79.1 or 336.4, etc. |
| 9 | pyroGlu-Glu | 20 to 100, for example, 23.8, 26.0, 47.4, or 98.0, etc. |
| 10 | pyroGlu-Gln | 5 to 150, for example, 9.6, 10.0, 20.0, or 123.0, etc. |
| 11 | Pro-Pro | 10 to 70, for example, 16.9, 35.0, 63.9, or 68.0, etc. |
| 12 | Pro-Glu | 10 to 40, for example, 15.4 or 37.9, etc. |
| 13 | Pro-Ser | 4 to 360, for example, 4.6, 17.7, or 78.0, etc. |
| 14 | Pro-Val | 3 to 120, for example, 3.7, 10.4, 26.0, or 110.0, etc. |
| 15 | Arg-Pro | 0.5 to 120, for example, 0.8, 10.7, 35.0, or 110.0, etc. |
| 16 | Ser-Pro | 5 to 360, for example, 8.3, 36.1, 207.0, or 356.0, etc. |
| 17 | Val-Pro | 5 to 140, for example, 6.1, 43.3, 84.0, or 139.0, etc. |
| 18 | Arg-Gly | 0.1 to 60, for example, 0.2, 1.4, 42.0, or 57.0, etc. |
| 19 | Gly-Arg | 0.5 to 200, for example, 0.9, 2.3, 114.0, or 198.0, etc. |

TABLE 10

| No | Long chain peptide | Molar ratio {Molarity of the other long chain peptide shown when the molarity of the long chain peptide LLL is set to 1} |
|---|---|---|
| 1 | ALDPLPT | 1 to 10, for example, 3.0 or 9.7, etc. |
| 2 | DGFP | 1 to 5, for example, 1.0 or 4.5, etc. |
| 3 | DGML | 1 to 500, for example, 3.0, 8.5, 13.0, or 445.5, etc. |
| 4 | DNEDTP | 0.5 to 120, for example, 0.6, 55.5, 58.5, 117.0, etc. |
| 5 | EEL | 30 to 150, for example, 31.83 or 145.0, etc. |
| 6 | EEV | 20 to 160, for example, 22.8, 152.5, etc. |
| 7 | EEY | 5 to 35, for example, 5.8 or 32.0, etc. |
| 8 | EVGYGY | 1 to 15, for example, 4.0 or 12.8, etc. |
| 9 | LDYY | 1 to 60, for example, 1.3, 30.0, or 58.7, etc. |
| 10 | LPPP | 10 to 70, for example, 15.0, 31.2, 35.0, or 67.0, etc. |
| 11 | MTTFTW | 20 to 40, for example, 20.5 or 32.5, etc. |
| 12 | PPPP | 1 to 170, for example, 2.0, 10.0, 28.3, or 166.5, etc. |
| 13 | PPPPP | 0.1 to 40, for example, 0.6, 4.0, 18.0, or 30.5, etc. |
| 14 | DAPL | 0.1 to 25, for example, 0.5, 1.0, 9.0, or 23.0, etc. |
| 15 | DVL | 5 to 100, for example, 9.0, 33.0, 35.5, or 96.0, etc. |
| 16 | GGPF | 0.1 to 10, for example, 0.5, 0.67, 2.0, or 6.0, etc. |
| 17 | LAL | 1 to 70, for example, 2.0, 3.5, or 60.0, etc. |
| 18 | LLL | 1 |
| 19 | PLL | 1 to 10, for example, 1.5, 4.5, 3.0, or 6.0, etc. |
| 20 | TPL | 5 to 200, for example, 6.5, 7.5, 15.0, or 190.0, etc. |

TABLE 11

| No | Dipeptide | Molar ratio {Molarity of the other dipeptide shown when the molarity of the dipeptide γ-Glu-Met is set to 1} |
|---|---|---|
| 1 | γ-Glu-Gly | 4 to 70, for example, 4.5, 5.3, or 70.0, etc. |
| 2 | γ-Glu-Leu | 2 to 25, for example, 2.0, 14.8, or 20.9, etc. |
| 3 | γ-Glu-Met | 1 |
| 4 | γ-Glu-His | 1 to 40, for example, 1.6, 2.2, or 40.0, etc. |
| 5 | pyroGlu-Glu | 20 to 100, for example, 23.8, 26.0, 47.4, or 98.0, etc. |
| 6 | pyroGlu-Gln | 5 to 150, for example, 9.6, 10.0, 20.0, or 123.0, etc. |
| 7 | Pro-Pro | 10 to 70, for example, 16.9, 35.0, 63.9, or 68.0, etc. |
| 8 | Pro-Ala | 40 to 170, for example, 44.0 or 164.0, etc. |
| 9 | Pro-Lys | 20 to 25, for example, 23.0 or 24.0, etc. |
| 10 | Pro-Val | 3 to 120, for example, 3.7, 10.4, 26.0, or 110.0, etc. |
| 11 | Arg-Pro | 0.5 to 120, for example, 0.8, 10.7, 35.0, or 110.0, etc. |
| 12 | Lys-Pro | 25 to 30, for example, 27.0, etc. |
| 13 | Ser-Pro | 5 to 360, for example, 8.3, 36.1, 207.0, or 356.0, etc. |

TABLE 11-continued

| No | Dipeptide | Molar ratio {Molarity of the other dipeptide shown when the molarity of the dipeptide γ-Glu-Met is set to 1} |
|---|---|---|
| 14 | Val-Pro | 5 to 140, for example, 6.1, 43.3, 84.0, or 139.0, etc. |
| 15 | Arg-Gly | 0.1 to 60, for example, 0.2, 1.4, 42.0, or 57.0, etc. |
| 16 | Gly-Arg | 0.5 to 200, for example, 0.9, 2.3, 114.0, or 198.0, etc. |

TABLE 12

| No | Long chain peptide | Molar ratio {Molarity of the other long chain peptide shown when the molarity of the long chain peptide LLL is set to 1} |
|---|---|---|
| 1 | DGML | 1 to 500, for example, 3.0, 8.5, 13.0, or 445.5, etc. |
| 2 | DNEDTP | 0.5 to 120, for example, 0.6, 55.5, 58.5, 117.0, etc. |
| 3 | LPPP | 10 to 70, for example, 15.0, 31.2, 35.0, or 67.0, etc. |
| 4 | PPPP | 1 to 170, for example, 2.0, 10.0, 28.3, or 166.5, etc. |
| 5 | PPPPP | 0.1 to 40, for example, 0.6, 4.0, 18.0, or 30.5, etc. |
| 6 | DAPL | 0.1 to 25, for example, 0.5, 1.0, 9.0, or 23.0, etc. |
| 7 | DVL | 5 to 100, for example, 9.0, 33.0, 35.5, or 96.0, etc. |
| 8 | GGPF | 0.1 to 10, for example, 0.5, 0.67, 2.0, or 6.0, etc. |
| 9 | EVLK | 5 to 100, for example, 9.0 or 90.0, etc. |
| 10 | LAL | 1 to 70, for example, 2.0, 3.5, or 60.0, etc. |
| 11 | LLL | 1 |
| 12 | LLQ | 0.1 to 15, for example, 0.5, 8.0, or 14.0, etc. |
| 13 | LPL | 1 to 30, for example, 3.0 or 20.0, etc. |
| 14 | PLL | 1 to 10, for example, 1.5, 4.5, 3.0, or 6.0, etc. |
| 15 | TPL | 5 to 200, for example, 6.5, 7.5, 15.0, or 190.0, etc. |
| 16 | VLL | 1 to 10, for example, 4.0 or 5.0, etc. |

TABLE 13

| No | Dipeptide | Molar ratio {Molarity of the other dipeptide shown when the molarity of the dipeptide γ-Glu-Met is set to 1} |
|---|---|---|
| 1 | γ-Glu-Gly | 4 to 70, for example, 4.5, 5.3, or 70.0, etc. |
| 2 | γ-Glu-Leu | 2 to 25, for example, 2.0, 14.8, or 20.9, etc. |
| 3 | γ-Glu-Met | 1 |
| 4 | γ-Glu-His | 1 to 40, for example, 1.6, 2.2, or 40.0, etc. |
| 5 | pyroGlu-Glu | 20 to 100, for example, 23.8, 26.0, 47.4, or 98.0, etc. |
| 6 | pyroGlu-Gln | 5 to 150, for example, 9.6, 10.0, 20.0, or 123.0, etc. |
| 7 | pyroGlu-Ser | 20 to 40, for example, 26.0, etc. |
| 8 | Pro-Pro | 10 to 70, for example, 16.9, 35.0, 63.9, or 68.0, etc. |
| 9 | Pro-Ala | 40 to 170, for example, 44.0 or 164.0, etc. |
| 10 | Pro-Lys | 20 to 25, for example, 23.0 or 24.0, etc. |
| 11 | Pro-Ser | 4 to 360, for example, 4.6, 17.7, or 78.0, etc. |
| 12 | Pro-Val | 3 to 120, for example, 3.7, 10.4, 26.0, or 110.0, etc. |
| 13 | Arg-Pro | 0.5 to 120, for example, 0.8, 10.7, 35.0, or 110.0, etc. |
| 14 | Ser-Pro | 5 to 360, for example, 8.3, 36.1, 207.0, or 356.0, etc. |
| 15 | Val-Pro | 5 to 140, for example, 6.1, 43.3, 84.0, or 139.0, etc. |
| 16 | Arg-Gly | 0.1 to 60, for example, 0.2, 1.4, 42.0, or 57.0, etc. |
| 17 | Gly-Arg | 0.5 to 200, for example, 0.9, 2.3, 114.0, or 198.0, etc. |

TABLE 14

| No | Long chain peptide | Molar ratio {Molarity of the other long chain peptide shown when the molarity of the long chain peptide LLL is set to 1} |
|---|---|---|
| 1 | DGFP | 1 to 5, for example, 1.0 or 4.5, etc. |
| 2 | DGML | 1 to 500, for example, 3.0, 8.5, 13.0, or 445.5, etc. |
| 3 | DNEDTP | 0.5 to 120, for example, 0.6, 55.5, 58.5, 117.0, etc. |
| 4 | LDYY | 1 to 60, for example, 1.3, 30.0, or 58.7, etc. |
| 5 | LPPP | 10 to 70, for example, 15.0, 31.2, 35.0, or 67.0, etc. |
| 6 | PPPP | 1 to 170, for example, 2.0, 10.0, 28.3, or 166.5, etc. |
| 7 | PPPPP | 0.1 to 40, for example, 0.6, 4.0, 18.0, or 30.5, etc. |
| 8 | DAPL | 0.1 to 25, for example, 0.5, 1.0, 9.0, or 23.0, etc. |

TABLE 14-continued

| No | Long chain peptide | Molar ratio {Molarity of the other long chain peptide shown when the molarity of the long chain peptide LLL is set to 1} |
|---|---|---|
| 9 | DVL | 5 to 100, for example, 9.0, 33.0, 35.5, or 96.0, etc. |
| 10 | GGPF | 0.1 to 10, for example, 0.5, 0.67, 2.0, or 6.0, etc. |
| 11 | EVLK | 5 to 100, for example, 9.0 or 90.0, etc. |
| 12 | FADSL | 0.0001 to 0.01, for example, 0.001, etc. |
| 13 | LAL | 1 to 70, for example, 2.0, 3.5, or 60.0, etc. |
| 14 | LLL | 1 |
| 15 | LLQ | 0.1 to 15, for example, 0.5, 8.0, or 14.0, etc. |
| 16 | LPL | 1 to 30, for example, 3.0 or 20.0, etc. |
| 17 | PLL | 1 to 10, for example, 1.5, 4.5, 3.0, or 6.0, etc. |
| 18 | TPL | 5 to 200, for example, 6.5, 7.5, 15.0, or 190.0, etc. |
| 19 | VLL | 1 to 10, for example, 4.0 or 5.0, etc. |

In one embodiment, the composition for flavor modulating, may comprise (1) (1) at least one arginyl-dipeptide selected from the group consisting of Arg-Ala, Ala-Arg, Arg-Asp, Asp-Arg, Arg-Gin, Gin-Arg, Arg-Gly, Gly-Arg, Arg-Lou, Lou-Arg, Arg-Lys, Lys-Arg, Arg-Pro, Pro-Arg, Arg-Ser, Ser-Arg, Arg-Val, and Val-Arg, (ii) at least one prolyl-dipeptide selected from the group consisting of Pro-Ala, Ala-Pro, Pro-Arg, Arg-Pro, Pro-Asn, Asn-Pro, Pro-Asp, Asp-Pro, Pro-Cys, Cys-Pro, Pro-Gln, Gin-Pro, Pro-Gly, Gly-Pro, Pro-His, His-Pro, Pro-Ile, Ile-Pro, Pro-Leu, Leu-Pro, Pro-Lys, Lys-Pro, Pro-Met, Met-Pro, Pro-Phe, Phe-Pro, Pro-Pro, Pro-Ser, Ser-Pro, Pro-Thr, Thr-Pro, Pro-Trp, Trp-Pro, Pro-Val, Val-Pro, Pro-Tyr, and Tyr-Pro, or (iii) a combination thereof;

(2) at least one selected from long chain peptides comprising amino acid sequences of ALDPLPT (SEQ ID NO: 1), DGFP (SEQ ID NO: 2), DGML (SEQ ID NO: 3), DNEDTP (SEQ ID NO: 4), DTDEPN (SEQ ID NO: 5), EEL (SEQ ID NO: 6), EEV (SEQ ID NO: 7), EEY (SEQ ID NO: 8), ESLPALP (SEQ ID NO: 9), EVGYGY (SEQ ID NO: 10), LDYY (SEQ ID NO: 11), LPPP (SEQ ID NO: 12), MTTFTW (SEQ ID NO: 13), PPPP (SEQ ID NO: 14), PPPPP (SEQ ID NO: 15), DAPL (SEQ ID NO: 16), DVL (SEQ ID NO: 17), GGPF (SEQ ID NO: 18), GNPF (SEQ ID NO: 19), EVLK (SEQ ID NO: 20), FADSL (SEQ ID NO: 21), LAL (SEQ ID NO: 22), LLL (SEQ ID NO: 23), LLQ (SEQ ID NO: 24), LPL (SEQ ID NO: 25), PLL (SEQ ID NO: 26), TPL (SEQ ID NO: 27), and VLL (SEQ ID NO: 28); or (3) a combination thereof.

In one embodiment, the composition for flavor modulating, may comprise (1) (i) at least one selected from arginyl-dipeptides consisting of Arg-Gly and Gly-Arg, (ii) at least one selected from prolyl-dipeptides consisting of Pro-Pro, Pro-Glu, Pro-Ala, Pro-Lys, Pro-Ser, Pro-Val, Arg-Pro, Lys-Pro, Ser-Pro, and Val-Pro, (iii) or a combination thereof;

(2) at least one selected from long chain peptides comprising amino acid sequences of ALDPLPT (SEQ ID NO: 1), DGFP (SEQ ID NO: 2), DGML (SEQ ID NO: 3), DNEDTP (SEQ ID NO: 4), DTDEPN (SEQ ID NO: 5), EEL (SEQ ID NO: 6), EEV (SEQ ID NO: 7), EEY (SEQ ID NO: 8), ESLPALP (SEQ ID NO: 9), EVGYGY (SEQ ID NO: 10), LDYY (SEQ ID NO: 11), LPPP (SEQ ID NO: 12), MTTFTW (SEQ ID NO: 13), PPPP (SEQ ID NO: 14), PPPPP (SEQ ID NO: 15), DAPL (SEQ ID NO: 16), DVL (SEQ ID NO: 17), GGPF (SEQ ID NO: 18), GNPF (SEQ ID NO: 19), EVLK (SEQ ID NO: 20), FADSL (SEQ ID NO: 21), LAL (SEQ ID NO: 22), LLL (SEQ ID NO: 23), LLQ (SEQ ID NO: 24), LPL (SEQ ID NO: 25), PLL (SEQ ID NO: 26), TPL (SEQ ID NO: 27), and VLL (SEQ ID NO: 28); or (3) a combination thereof.

In one embodiment, the composition for flavor modulating, may comprise (1) at least one selected from dipeptides consisting of Pro-Pro, Pro-Val, Arg-Pro, Ser-Pro, Val-Pro, Arg-Gly, and Gly-Arg;

(2) at least one selected from long chain peptides comprising amino acid sequences of DGML (SEQ ID NO: 3), DNEDTP (SEQ ID NO: 4), LPPP (SEQ ID NO: 12), PPPP (SEQ ID NO: 14), PPPPP (SEQ ID NO: 15), DAPL (SEQ ID NO: 16), DVL (SEQ ID NO: 17), GGPF (SEQ ID NO: 18), LAL (SEQ ID NO: 22), LLL (SEQ ID NO: 23), PLL (SEQ ID NO: 26), and TPL (SEQ ID NO: 27); or (3) a combination thereof.

In one embodiment, the composition for flavor modulating, may further comprise (1) at least one selected from dipeptides consisting of Pro-Glu, Pro-Ala, Pro-Lys, Pro-Ser, and Lys-Pro;

(2) at least one selected from long chain peptides comprising amino acid sequences of ALDPLPT (SEQ ID NO: 1), DGFP (SEQ ID NO: 2), EEL (SEQ ID NO: 6), EEV (SEQ ID NO: 7), EEY (SEQ ID NO: 8), ESLPALP (SEQ ID NO: 9), EVGYGY (SEQ ID NO: 10), LDYY (SEQ ID NO: 11), MTTFTW (SEQ ID NO: 13), EVLK (SEQ ID NO: 20), FADSL (SEQ ID NO: 21), LLQ (SEQ ID NO: 24), LPL (SEQ ID NO: 25), and VLL (SEQ ID NO: 28); or (3) a combination thereof.

In one embodiment, the composition for flavor modulating, according to claim 1, may comprise (1) (1-i) at least one selected from dipeptides consisting of Pro-Pro, Pro-Glu, Pro-Ser, Pro-Val, Arg-Pro, Ser-Pro, Val-Pro, Arg-Gly, and Gly-Arg;

(1-ii) at least one selected from dipeptides consisting of Pro-Pro, Pro-Ala, Pro-Lys, Pro-Val, Arg-Pro, Ser-Pro, Val-Pro, Arg-Gly, and Gly-Arg; or (1-iii) at least one selected from dipeptides consisting of Pro-Pro, Pro-Ala, Pro-Lys, Pro-Ser, Pro-Val, Arg-Pro, Ser-Pro, Val-Pro, Arg-Gly, and Gly-Arg;

(2) (2-i) at least one selected from long chain peptides comprising amino acid sequences of ALDPLPT (SEQ ID NO: 1), DGML (SEQ ID NO: 3), DNEDTP (SEQ ID NO: 4), EEL (SEQ ID NO: 6), EEV (SEQ ID NO: 7), EEY (SEQ ID NO: 8), ESLPALP (SEQ ID NO: 9), EVGYGY (SEQ ID NO: 10), LDYY (SEQ ID NO: 11), LPPP (SEQ ID NO: 12), MTTFTW (SEQ ID NO: 13), PPPP (SEQ ID NO: 14), PPPPP (SEQ ID NO: 15), DAPL (SEQ ID NO: 16), DVL (SEQ ID NO: 17), GGPF (SEQ ID NO: 18), LAL (SEQ ID NO: 22), LLL (SEQ ID NO: 23), LLQ (SEQ ID NO: 24), PLL (SEQ ID NO: 26), and TPL (SEQ ID NO: 27);

(2-ii) at least one selected from long chain peptides comprising amino acid sequences of ALDPLPT (SEQ ID NO: 1), DGFP (SEQ ID NO: 2), DGML (SEQ ID NO: 3), DNEDTP (SEQ ID NO: 4), EEL (SEQ ID NO: 6), EEV (SEQ ID NO: 7), EEY (SEQ ID NO: 8), EVGYGY (SEQ ID NO: 10), LDYY (SEQ ID NO: 11), LPPP (SEQ ID NO: 12), MTTFTW (SEQ ID NO: 13), PPPP (SEQ ID NO: 14), PPPPP (SEQ ID NO: 15), DAPL (SEQ ID NO: 16), DVL (SEQ ID NO: 17), GGPF (SEQ ID NO: 18), LAL (SEQ ID NO: 22), LLL (SEQ ID NO: 23), PLL (SEQ ID NO: 26), and TPL (SEQ ID NO: 27), (2-iii) at least one selected from long chain peptides comprising amino acid sequences of DGML (SEQ ID NO: 3), DNEDTP (SEQ ID NO: 4), LPPP (SEQ ID NO: 12), PPPP (SEQ ID NO: 14), PPPPP (SEQ ID NO: 15), DAPL (SEQ ID NO: 16), DVL (SEQ ID NO: 17), GGPF (SEQ ID NO: 18), EVLK (SEQ ID NO: 20), LAL (SEQ ID NO: 22), LLL (SEQ ID NO: 23), LLQ (SEQ ID NO: 24), LPL (SEQ ID NO: 25), PLL (SEQ ID NO: 26), TPL (SEQ ID NO: 27), and VLL (SEQ ID NO: 28); or (2-iv) at least one selected from long chain peptides comprising amino acid sequences of DGFP (SEQ ID NO: 2), DGML (SEQ ID NO: 3), DNEDTP (SEQ ID NO: 4), LDYY (SEQ ID NO: 11), LPPP (SEQ ID NO: 12), PPPP (SEQ ID NO: 14), PPPPP (SEQ ID NO: 15), DAPL (SEQ ID NO: 16), DVL (SEQ ID NO: 17), GGPF (SEQ ID NO: 18), EVLK (SEQ ID NO: 20), FADSL (SEQ ID NO: 21), LAL (SEQ ID NO: 22), LLL (SEQ ID NO: 23), LLQ (SEQ ID NO: 24), LPL (SEQ ID NO: 25), PLL (SEQ ID NO: 26), TPL (SEQ ID NO: 27), and VLL (SEQ ID NO: 28); or (3) a combination thereof.

The composition for flavor modulating can achieve an effect of further modulating flavor (for example, an effect of modulating umami taste (umami taste, or kokumi taste, etc.) and the like) compared to a control group (for example, a composition not comprising the dipeptide and/or the long chain peptide), by comprising the dipeptide and/or the long chain peptide.

In the present description, modulating flavor may mean exhibiting an effect of further strengthening the original taste of food (for example, sweet taste, sour taste, bitter taste, kokumi taste, salty taste, umami taste, kokumi taste, umami taste, or a combination thereof, particularly, umami taste such as kokumi taste or umami taste), or making these tastes appear in food which does not have these taste components.

The dipeptide compound and/or long chain peptide compound comprised in the composition for flavor modulating may be derived from a fermented food. The fermented food may be a fermented food obtained by fermenting meat (for example, beef, pork, chicken, etc.), fish (for example, anchovy, shrimp, etc.), vegetables (for example, napa cabbage, cabbage, radish, garlic, onion, chili pepper, etc.), grains (for example, rice, wheat, soybean, miso, etc.). As one example of the fermented food, it includes rice fermented paste, soybean fermented paste, wheat fermented paste, soy sauce, kimchi, soybean paste, fish sauce, miso, natto, tempeh, sauerkraut, salami, jamon, nuoc mam, and the like, but not limited thereto.

Other aspect, provides a use of the dipeptide, the long chain peptide, or a combination thereof for using in modulating flavor of food.

Other aspect, provides a use of the dipeptide, the long chain peptide, or a combination thereof for using in preparation of a composition for flavor modulating.

Food Composition

Other aspect, relates to a food composition or food additive composition, comprising the composition for flavor modulating.

The composition for flavor modulating can achieve an effect of modulating flavor by being comprised in a food composition. Modulating flavor may mean strengthening original basic tastes of the food composition and the like, as described above, and for example, it may be strengthening umami taste and/or kokumi taste and the like of the food composition.

The food composition may mean meat, sausages, bread, chocolate, candy, snacks, confectionery, pizza, ramen, other noodles, gum, dairy products including ice cream, various kinds of soups, beverages, tea, drinks, alcoholic beverages, vitamin complexes, health functional foods and health foods and the like, and may include all food in the conventional meaning.

In one embodiment, the food composition may be a fermented food. The fermented food is as described above.

The food composition may be recombinantly prepared.

In other words, the food composition, may be recombinantly preparing substances (for example, amino acids, saccharides, nucleic acids, etc.) composing taste components.

In one embodiment, the food composition prepared recombinantly may comprise the following substances, but not limited thereto:

at least one selected from the group consisting of arginine, histidine, lysine, aspartic acid, glutamic acid, serine, threonine, asparagine, glutamine, cysteine, glycine, proline, alanine, valine, isoleucine, leucine, methionine, phenylalanine, tyrosine and tryptophan; amino acid derivatives such as betaine (CAS No. 107-43-7) and the like; organic acids such as acetic acid, lactic acid, citric acid, malic acid, and the like; monosaccharides such as glucose, galactose, mannose, and the like; nucleosides such as inosine, deoxyinosine, adenosine, deoxyadenosine, guanosine, deoxyguanosine, 5-methyluridine, deoxythymidine, uridine, deoxyuridine, cytidine, deoxycytidine, and the like; nucleotides such as inosine monophosphate, deoxyinosine monophosphate, adenosine monophosphate, deoxyadenosine monophosphate, guanosine monophosphate, deoxyguanosine monophosphate, 5-methyluridine monophosphate, deoxythymidine monophosphate, uridine monophosphate, deoxyuridine monophosphate, cytidine monophosphate, deoxycytidine monophosphate and the like; purine bases such as hypoxanthine, xanthine, purine, adenine, guanine, theophylline, theobromine, caffeine, uric acid, isoguanine and the like; ammonium, potassium, magnesium, sodium, chloride, and the like.

The food composition prepared recombinantly as above has a problem in that it is difficult to realize the original basic taste of food, but the food composition comprising the composition for flavor modulating has an advantage capable of excellently realizing the original basic taste of food as the flavor is modulated.

The composition for flavor modulating can further modulate flavor compared to a control group (for example, when a composition for flavor modulating not comprising the dipeptide compound is applied), or achieve an effect of excellently realizing the original basic taste of food, when it is applied to a food composition, by comprising the dipeptide compound.

The composition for flavor modulating can further modulate flavor compared to a control group (for example, when a composition for flavor modulating not comprising the long chain peptide compound is applied), or achieve an effect of excellently realizing the original basic taste of food, when it is applied to a food composition, by comprising the long chain peptide compound.

The ratio of the composition for flavor modulating comprised in the food composition, may be 0.0001 to 2%, 0.0001 to 1.875%, 0.0001 to 1.75%, 0.0001 to 1.625%, 0.0001 to 1.5%, 0.0001 to 1.375%, 0.0001 to 1.25%, 0.0001 to 1.125%, 0.0001 to 1%, 0.0001 to 0.875%, 0.0001 to 0.75%, 0.0001 to 0.5%, 0.0005 to 2%, 0.0005 to 1.875%, 0.0005 to 1.75%, 0.0005 to 1.625%, 0.0005 to 1.5%, 0.0005 to 1.375%, 0.0005 to 1.25%, 0.0005 to 1.125%, 0.0005 to 1%, 0.0005 to 0.875%, 0.0005 to 0.75%, 0.0005 to 0.5%, 0.001 to 2%, 0.001 to 1.875%, 0.001 to 1.75%, 0.001 to 1.625%, 0.001 to 1.5%, 0.001 to 1.375%, 0.001 to 1.25%, 0.001 to 1.125%, 0.001 to 1%, 0.001 to 0.875%, 0.001 to 0.75%, 0.001 to 0.5%, 0.005 to 2%, 0.005 to 1.875%, 0.005 to 1.75%, 0.005 to 1.625%, 0.005 to 1.5%, 0.005 to 1.375%, 0.005 to 1.25%, 0.005 to 1.125%, 0.005 to 1%, 0.005 to 0.875%, 0.005 to 0.75%, 0.005 to 0.5%, 0.01 to 2%, 0.01 to 1.875%, 0.01 to 1.75%, 0.01 to 1.625%, 0.01 to 1.5%, 0.01 to 1.375%, 0.01 to 1.25%, 0.01 to 1.125%, 0.01 to 1%, 0.01 to 0.875%, 0.01 to 0.75%, 0.01 to 0.5%, 0.02 to 2%, 0.02 to 1.875%, 0.02 to 1.75%, 0.02 to 1.625%, 0.02 to 1.5%, 0.02 to 1.375%, 0.02 to 1.25%, 0.02 to 1.125%, 0.02 to 1%, 0.02 to 0.875%, 0.02 to 0.75%, or 0.02 to 0.5%, to the molarity of the total components comprised in the composition, but not limited thereto, and for example, it may be 0.010%, 0.012%, 0.280%, or 0.518%.

Other aspect, provides a use of the dipeptide, the long chain peptide, or a combination thereof for using in preparation of a composition for flavor modulating.

Other aspect, provides a method for flavor modulating (for example, method for modulating flavor of food), comprising applying the dipeptide, the long chain peptide, or a combination thereof or the composition for flavor modulating to food.

Advantageous Effects

The present application has newly identified a taste modulation compound having an effect of modulating a taste of Korean food based on fermentation technology, and the dipeptide and/or long chain peptide of the present application have an excellent effect of modulating a taste of food.

BRIEF DESCRIPTION OF THE DRAWINGS

FIG. 1 shows a schematic diagram of the desalination process and sample preparation method for sensory evaluation, for sensory evaluation of Korean fermented food.

FIG. 2*a* to FIG. 2*d* show the concentration (umol/L) of various taste components comprised in 25 samples, and is the result of diagramming this.

FIG. 3 shows the sensory evaluation result of the soy sauce samples (SS5, SS6) and recombinant soy sauce sample (Recombinant).

FIG. 4 shows the sensory evaluation result of the rice fermented pastes (FRP2, FRP3) and recombinant fermented rice paste (Recombinant).

FIG. 5 shows the experimental result of separating/fractionating the soy sauce samples (SS5, SS6) with methanol aqueous solutions at various concentrations, and confirming taste characteristics thereof.

FIG. 6 shows the experimental result of separating/fractionating the fermented rice paste samples (FRP2, FRP3) with methanol aqueous solutions at various concentrations, and confirming taste characteristics thereof.

FIG. 7 shows the sensory evaluation result of the soy sauce samples (SS5, SS6) and soy sauce recombinant sample 1(R1).

FIG. 8 shows the sensory evaluation result of the fermented rice paste samples (FRP2, FRP3) and fermented rice paste recombinant sample 1 (R1).

FIG. 9 and FIG. 10 confirm the threshold values of concentrations at which long chain peptide compounds are sensed sensually and show them with a graph.

FIG. 11 shows the result of comparing the sensory evaluation result of 4 kinds of the recombinant sample 1 (SS5-R1, SS6-R1, FRP2-R1, FRP3-R1) and the sensory evaluation result of the recombinant sample 2 (SS5-R2, SS6-R2, FRP2-R2, FRP3-R2).

MODE FOR INVENTION

Hereinafter, the present invention will be described in more detail by the following examples. However, they are intended to illustrate the present invention only, but the scope of the present invention is not limited by these examples.

Example 1. Sensory Evaluation of Various Korean Fermented Foods

Sensory evaluation was conducted by preparing samples of 25 kinds of various Korean fermented foods (3 kinds of fermented rice paste (FRP), 5 kinds of fermented soybean paste (FSP), 2 kinds of fermented wheat paste (FWP), 6 kinds of fish sauce (FS), 1 kind of liquid kimchi (LK), 6 kinds of soy sauce (SS), 2 kinds of yeast extract (YE)). The food samples were acquired from CJ CheilJedang, or used by directly preparing.

For objective taste evaluation, all the samples were under a desalination process, and the schematic diagram of the desalination process and method for preparing samples for sensory evaluation is as shown in FIG. 1.

Specifically, the samples were homogenized, and then extracted with hot water of 80~100° C., and then lyophilized. After that, after desalination with methanol solution of 70% (v/v), the solution was removed and lyophilized again to prepare desalinated samples for sensory evaluation.

All the prepared samples for sensory evaluation were prepared as liquid samples at the same concentration (that is, mixed at a weight ratio of sample:water=1:3), and the sensory evaluation condition was same as Table 15 below.

TABLE 15

| | |
|---|---|
| Sample | 25 |
| Panel | 27 people<br>(23~31-aged male/female, panels trained in sensory evaluation for at least 2 years) |
| Sensory evaluation item/scale | 6 taste attributes (sour taste, salty taste, sweet taste, bitter taste, umami taste, kokumi taste)/<br>5-point scale |
| Sensory evaluation standard product | Bottle water (Evian, low mineralization, 500 mg/L)<br>sucrose (50 mmol/L)<br>lactic acid (20 mmol/L)<br>NaCl (12 mmol/L)<br>caffeine (1 mmol/L)<br>sodium L-glutamate (8 mmol/L, pH 5.7)<br>model broth* spiked with glutathione (5 mmol/L) |
| Sample preparation | pH 5.7. sample:water = 1:3 (weight ratio) |
| Note | Using a nose clamp to minimize an effect by scent |

*model broth: NaCl 2.9 g/L, MSG 1.9 g/L, YE (Gistex XII LS) 2.1 g/L, Maltodextrin 6.4 g/L The sensory evaluation result of 25 kinds of the samples progressed by the above method was shown in Table 16 below. Six of the taste attributes (sweet taste, sour taste, bitter taste, kokumi taste, salty taste, umami taste) of each sample were shown with a 5-point scale.

TABLE 16

| No. | Sample | Sweet taste | Sour taste | Bitter taste | Kokumi taste | Salty taste | Umami taste |
|---|---|---|---|---|---|---|---|
| 1 | SS1 | 0.8824 | 0.9014 | 1.409 | 1.14 | 2.913 | 2.006 |
| 2 | SS2 | 0.7591 | 0.7181 | 1.706 | 1.326 | 3.016 | 2.239 |
| 3 | SS3 | 0.8136 | 0.8062 | 2.104 | 1.329 | 2.442 | 2.23 |
| 4 | SS4 | 1.08 | 1.105 | 1.402 | 1.437 | 2.909 | 2.343 |
| 5 | SS5 | 0.803 | 1.252 | 1.932 | 1.637 | 3.159 | 2.569 |
| 6 | SS6 | 1.226 | 1.202 | 1.719 | 1.654 | 2.906 | 2.699 |
| 7 | FS1 | 0.6134 | 1.424 | 2.394 | 0.9387 | 2.898 | 1.696 |
| 8 | FS2 | 0.7519 | 2.228 | 0.9752 | 1.354 | 2.771 | 1.811 |
| 9 | FS3 | 0.8827 | 1.401 | 2.252 | 1.416 | 2.628 | 1.719 |
| 10 | FS4 | 0.8557 | 1.244 | 1.457 | 1.17 | 2.369 | 1.655 |
| 11 | FS5 | 0.7807 | 1.088 | 1.119 | 1.236 | 2.36 | 1.846 |
| 12 | FS6 | 0.8213 | 0.9848 | 1.135 | 1.524 | 2.866 | 2.305 |
| 13 | FSP1 | 0.4432 | 1.041 | 0.1981 | 0.4277 | 2.205 | 1.027 |
| 14 | FSP2 | 0.6391 | 1.195 | 0.8022 | 0.7485 | 2.73 | 1.502 |
| 15 | FSP3 | 0.4391 | 1.045 | 2.161 | 0.6694 | 2.172 | 1.377 |
| 16 | FSP4 | 0.9819 | 0.9463 | 0.6738 | 0.8334 | 1.787 | 1.53 |
| 17 | FSP5 | 1.253 | 0.788 | 0.628 | 1.042 | 2.128 | 1.805 |
| 18 | FWP1 | 1.15 | 1.099 | 0.198 | 0.9664 | 2.208 | 1.798 |
| 19 | FWP2 | 1.356 | 0.7987 | 0.2547 | 1.11 | 1.668 | 1.664 |
| 20 | FRP1 | 1.898 | 0.6261 | 0.1501 | 1.17 | 1.776 | 1.573 |
| 21 | FRP2 | 1.753 | 0.8951 | 0.4055 | 1.357 | 3.021 | 1.723 |
| 22 | FRP3 | 2.223 | 1.06 | 0.2298 | 1.281 | 2.821 | 2 |
| 23 | LK1 | 1.431 | 0.6325 | 0.5127 | 0.8738 | 1.156 | 1.182 |
| 24 | YE1 | 1.199 | 1.175 | 0.9413 | 1.527 | 1.449 | 2.324 |
| 25 | YE2 | 0.9094 | 1.136 | 0.6627 | 1.688 | 2.109 | 2.539 |

Example 2. Sensory Evaluation of Fractions of Korean Fermented Foods

Sensory Evaluation

In order to identify unknown taste components, which was not comprised in Korean fermented foods, sensory evaluation for the fractions of Korean fermented foods was performed.

Sensory evaluation of the fractions is an experiment of confirming the minimal cognitive concentration of taste by continuously diluting fractions of food samples, and this experiment is known as Taste Dilution Analysis (TDA), Comparative Taste Dilution Analysis (cTDA) (J. Agric. Food Chem. 2003, 51, 1035-1041). The fractionized samples were pretreated using SPE (Solid Phase Extraction), and recombinants using basic taste components were used during dilution. For each sample, all the 6 sensory evaluation items were evaluated, and it was diluted at a ratio of 1:2 (volume ratio) in the basic concentration sample during dilution. The initial concentration began at 1 mmol/L, and in order to confirm the minimal cognitive concentration, TDA, cTDA methods were used. All the samples were corrected using formic acid 1% (v/v) solution at pH 5.4, and they were diluted at a ratio of 1:2 in stages.

Quantitative Analysis

Quantitative analysis of the taste components comprised in the samples of 25 kinds of the Korean fermented foods of Example 1 was performed. Items of the taste components were ions (cations, anions), free amino acids, nucleic acids, organic acids, saccharides (monosaccharides, disaccharides), and dipeptides. For all the samples for quantitative analysis, the desalination process was progressed and lyophilized by the same method as Example 1.

Ion (cation, anion) analysis was analyzed based on the external standard product using high performance ion chromatography (HP-IC).

The free amino acids and nucleic acids, and dipeptides were analyzed using liquid chromatography-mass/mass spectrometer (LC-MS/MS), and all were under quantitative analysis using an isotopically labeled internal standard substance.

Organic acids and saccharides were analyzed using internal analysis database using quantitative nuclear magnetic resonance spectroscopy (q-NMR).

Detailed analysis items and analysis equipment, conditions were described in Table 17 below.

TABLE 17

| Analysis item | Equipment | Analysis condition |
|---|---|---|
| Cations | HP-IC<br>Dionex ICS-2000 | Dionex lonPac CS19<br>(250 × 2.0 mm)<br>0.25 mL/min<br>2 mM methanesulfonic acid |
| Anions | HP-IC<br>Dionex ICS-5000 | Dionex lonPac AS11-HC-4 μm<br>(250 × 2.0 mm)<br>0.015 mL/min<br>1 mM potassium hydroxide (KOH) |
| Organic acids/ saccharides | 500 MHz ultrashield plus Avance III NMR | $D_2O$ |
| Free amino acids | API 4000 QTRAP mass spectrometer | XBridge Amide (2.1 × 150 mm, 5 μm)<br>acetonitrile/aqueous ammonium acetate (pH 3.0. 5 mmol/L) |
| Nucleic acids | API 4000 QTRAP system | XBridge Amide column<br>(2.1 × 150 mm, 5 μm)<br>acetonitrile/ammonium acetate<br>(pH 9.0. 5 mmol/L) |
| Peptides (Glutamyl) | API 4000 QTRAP mass spectrometer | Acquity UPLC BEH Amide column<br>(2.1 × 150 mm, 1.7 μm)<br>acetonitrile/ammonium acetate<br>(pH 2.0. 5 mmol/L) |

The result of the taste component analysis result of the 25 samples was schematized and shown in FIG. 2*a* to FIG. 3*d*.

In other words, FIG. 2*a* to FIG. 2*d* are results of representing the concentration of the various taste components comprised in the 25 samples with log 10, and schematizing this.

Example 3. Sensory Evaluation of Soy Sauce and Fermented Rice Paste Recombinant Samples Using substances confirmed through the taste component quantitative analysis of the samples, recombinant samples for 2 kinds of soy sauce (SS) and 2 kinds of fermented rice paste (FRP) were prepared (soy sauce recombinant samples: SS5-BR, SS6-BR, fermented rice paste recombinant samples: FRP2-BR, FRP3-BR).

The taste component compositions of the recombinant samples were shown in Table 18 below. The unit was expressed by g, and the ratio of the taste components to the total weight of the recombinant samples was expressed as % (w/w) in parentheses.

TABLE 18

| | SS5-BR | SS6-BR | FRP2-BR | FRP3-BR |
|---|---|---|---|---|
| Glutamic acid | 4.2 (12.84%) | 4.5 (12.36%) | 0.1 (0.64%) | 0.1 (0.55%) |
| Aspartic acid | 0.7 (2.14%) | 0.8 (2.20%) | 0.07 (0.45%) | 0.07 (0.38%) |
| Glucose | — | — | 3.9 (24.89%) | 5.7 (31.20%) |
| Alanine | 3.3 (10.09%) | 2.8 (7.69%) | — | — |
| Valine | 2.9 (8.87%) | 3.7 (10.16%) | — | — |
| Proline | 2.7 (8.26%) | 3.2 (8.79%) | — | — |
| Leucine | 4.4 (13.46%) | 6.1 (16.76%) | — | — |
| Isoleucine | 3.1 (9.48%) | 4.2 (11.54%) | — | — |
| Sodium | 8.1 (24.77%) | 7.6 (20.88%) | 10.7 (68.28%) | 11.7 (64.04%) |
| Potassium | 3.1 (9.48%) | 3.1 (8.52%) | 0.7 (4.47%) | 0.6 (3.28%) |
| Magnesium | 0.2 (0.61%) | 0.4 (1.10%) | 0.2 (1.28%) | 0.1 (0.55%) |
| Total | 32.7 (100%) | 36.4 (100%) | 15.67 (100%) | 18.27 (100%) |

Sensory evaluation of 4 kinds of the recombinant samples was performed by the same method as Example 1, and the result of comparing the sensory evaluation result of the soy sauce samples (SS5, SS6) and fermented rice paste samples (FRP2, FRP3) of Example 1 and the sensory evaluation result of the recombinant samples was shown in FIG. 3 and FIG. 4.

As could be confirmed in FIG. 3 (sensory evaluation result of the soy sauce samples and recombinant soy sauce samples) and FIG. 4 (sensory evaluation result of the fermented rice paste samples and recombinant fermented rice paste samples), the soy sauce and fermented rice paste sample and each recombinant sample showed sensory evaluation results different from each other.

Such a result indicates that another taste component other than the taste components comprised in the soy sauce and fermented rice paste recombinant samples is additionally required in order to embody the taste of the soy sauce and fermented rice paste samples.

Example 4. Analysis of Taste Components in Soy Sauce and Fermented Rice Paste Samples I As it was confirmed that the sensory evaluation results of the soy sauce and fermented rice paste samples were different in Example 3, an additional experiment to identify a substance having a special effect of umami taste modulating in the soy sauce and fermented rice paste samples was performed. After passing through a desalination process of 4 kinds of the soy sauce and fermented rice pastes samples (soy sauce samples: SS5, SS6 of Table 20, fermented rice paste samples: FRP2, FRP3 of Table 20), they were separated and fractionized using a chromatography method (Solid-Phase Extraction, SPE), and sensory characteristics were confirmed by each separated section. This chromatography can be performed using not only SPE but also various methods such as MPLC (Medium pressure liquid chromatography), FPLC (Fast protein liquid chromatography) and the like.

Specifically, the SPE chromatography was performed by the following process.

In order to activate the cartridge of SPE, methanol of 60~70 mL was flowed. After that, it was washed with distilled water 2~3 times, and then the prepared samples were loaded. After completing sample loading, all liquid was drained, and the samples were adsorbed to the cartridge and then extracted using an appropriate solvent. The solvent used in the present application was as follows, and methanol, ethanol and water were used at various composition ratios (v/v).

The experimental result of confirming separation/fractionization and taste characteristics for the soy sauce samples (SS5, SS6) was shown in FIG. 5, and the experimental result of confirming separation/fractionization and taste characteristics for the fermented rice paste samples (FRP2, FRP3) was shown in FIG. 6.

Taste components comprised in the obtained fractions of 4 kinds of the soy sauce and fermented rice paste samples were analyzed. In order to identify substances having an effect of modulating umami taste unknown in Korean fermented foods, a trace component analysis experiment was conducted for the fractions. For analysis of peptides comprised in the fractions, using LC-QTrap-MS, peptide analysis was performed. A specific experimental method was same as Table 19 below.

TABLE 19

| Analysis item | Equipment | Analysis condition |
|---|---|---|
| Peptide (Prolyl. Arginyl) | 6500 + Q-Trap Mass Spectrometer | ACQITY UPLC ® BEH Amide 1.7 μm (2.1 × 100 mm 0.4 mL/min A: 5 mM NH4Ac-Puffer aq., pH 2 B: Acetonitrile/H2O (v/v, 95/5), 5 mM NH4Ac-Puffer, pH 2 |

As the result of peptide analysis, the main substances detected from the fraction were dipeptide compounds (prolyl peptides and arginyl peptides), and specifically, the detected dipeptide compounds were described in Table 20 below.

TABLE 20

| No | Dipeptide |
|---|---|
| 1 | L-prolyl-L-alanine, Pro-Ala |
| 2 | L-alanyl-L-proline, Ala-Pro |
| 3 | L-prolyl-L-arginine, Pro-Arg |
| 4 | L-arginyl-L-proline, Arg-Pro |
| 5 | L-prolyl-L-asparagine, Pro-Asn |
| 6 | L-asparaginyl-L-proline, Asn-Pro |
| 7 | L-prolyl-L-aspartic acid, Pro-Asp |
| 8 | L-aspartyl-L-proline, Asp-Pro |
| 9 | L-prolyl-L-cysteine, Pro-Cys |
| 10 | L-cysteinyl-L-proline, Cys-Pro |
| 11 | L-prolyl-L-glutamine, Pro-Gln |
| 12 | L-glutaminyl-proline, Gln-Pro |
| 13 | L-prolyl-L-glutamic acid, Pro-Glu |
| 14 | L-glutamyl-L-proline, Glu-Pro |
| 15 | L-prolyl-L-glycine, Pro-Gly |
| 16 | L-glycyl-L-proline, Gly-Pro |
| 17 | L-prolyl-L-histidine, Pro-His |
| 18 | L-histidyl-L-proline, His-Pro |
| 19 | L-prolyl-L-isoleucine, Pro-Ile |
| 20 | L-isoleucyl-L-proline, Ile-Pro |
| 21 | L-prolyl-L-leucine, Pro-Leu |
| 22 | L-leucyl-L-proline, Leu-Pro |
| 23 | L-prolyl-L-lysine, Pro-Lys |
| 24 | L-lysyl-L-proline, Lys-Pro |
| 25 | L-prolyl-L-methionine, Pro-Met |
| 26 | L-methionyl-L-proline, Met-Pro |
| 27 | L-prolyl-L-phenylalanine, Pro-Phe |
| 28 | L-phenylalanyl-L-proline, Phe-Pro |
| 29 | L-prolyl-L-proline, Pro-Pro |
| 30 | L-prolyl-L-serine, Pro-Ser |
| 31 | L-seryl-L-proline, Ser-Pro |
| 32 | L-prolyl-L-threonine, Pro-Thr |
| 33 | L-threonyl-L-proline, Thr-Pro |
| 34 | L-prolyl-L-tryptophane, Pro-Trp |
| 35 | L-tryptophyl-L-proline, Trp-Pro |
| 36 | L-prolyl-L-tyrosine, Pro-Tyr |
| 37 | L-tyrosyl-L-proline, Tyr-Pro |
| 38 | L-prolyl-L-valine, Pro-Val |
| 39 | L-valyl-L-proline, Val-Pro |
| 40 | D-Pro-L-Pro |
| 41 | Gly-Arg |
| 42 | Arg-Gly |

Taste characteristics of each of the newly analyzed dipeptide compounds from the soy sauce and fermented rice paste samples were confirmed through Taste Dilution Analysis (TDA), Comparative Taste Dilution Analysis (cTDA) experiments, and it was confirmed that the dipeptide had an effect of increasing the salty taste and umami taste.

Example 5. Sensory Evaluation of Soy Sauce and Fermented Rice Paste Recombinant Sample Comprising Newly Identified Dipeptides By adding newly identified dipeptide compounds in Table 20 and the to the recombinant sample prepared in Example 3, recombinant sample 1 (R1-recombinant1) of the soy sauce and fermented soy paste was prepared. In Table 21 to Table 29 below, the compositions of the recombinant sample 1 of soy sauce and fermented rice paste were shown. The values of Table 21 to Table 29 mean concentrations (umol/L) of each component, and the relative standard deviation (RSD (%)) was described after the numerical value. When preparing the recombinant sample 1, after confirming the quantitative analysis result and the cognitive threshold concentration of each component, it was prepared with substances selected according to the standard of Dot factor (a value calculated by dividing each component present in the sample with DoT)>0.1 in consideration of DoT (Does of Threshold).

TABLE 21

| Group 1: Umami | | | | |
|---|---|---|---|---|
| | SS5-R1 | SS6-R1 | FRP2-R1 | FRP3-R1 |
| L-Asparagine | 176 (±8) | 182 (±4.7) | 26 (±2.0) | 79 (±2.2) |
| L-Aspartic acid | 5267 (±2.7) | 6445 (±8.5) | 515 (±6.5) | 498 (±2.5) |
| L-Glutamine | 13773 (±2.5) | 17403 (±6.3) | 930 (±3.6) | 564 (±2.3) |
| L-Glutamic acid | 28973 (±3.0) | 30617 (±4.2) | 904 (±4.6) | 708 (±1.9) |
| Succinic acid | 2604 | 2331 | — | — |

TABLE 22

| Group 2: Sweet | | | | |
|---|---|---|---|---|
| | SS5-R1 | SS6-R1 | FRP2-R1 | FRP3-R1 |
| L-Alanine | 37304 (±6.8) | 31397 (±4.5) | 986 (±3.8) | 1001 (±0.3) |
| L-Proline | 23275 (±3.4) | 27988 (±6.0) | 355 (±5.7) | 297 (±3.5) |
| L-Threonine | 17393 (±3.7) | 17278 (±7.5) | 339 (±4.3) | 351 (±2.2) |
| L-Serine | 12320 (±4.0) | 14346 (±6.8) | 527 (±4.1) | 617 (±7.5) |
| Glycine | 14232 (±5.8) | 15556 (±6.5) | 479 (±5.4) | 484 (±0.2) |
| Glucose | 7367 | 10009 | 325754 | 330817 |
| Betaine | 766 | 981 | — | — |

TABLE 23

| Group 3: Bitter | | | | |
|---|---|---|---|---|
| | SS5-R1 | SS6-R1 | FRP2-R1 | FRP3-R1 |
| L-Arginine | 6415 (±2.1) | 5463 (±6.1) | 583 (±5.2) | 623 (±0.4) |
| L-Histidine | 2065 (±2.7) | 2842 (±9.7) | 161 (±0.5) | 128 (±0.6) |
| L-Isoleucine | 23692 (±18.6) | 32358 (±8.2) | 579 (±3.5) | 458 (±3.2) |
| L-Leucine | 33898 (±19.5) | 46673 (±9.0) | 1046 (±4.0) | 918 (±2.0) |
| L-Lysine | 11174 (±7.9) | 14418 (±6.9) | 720 (±5.8) | 476 (±0.3) |
| L-Methionine | 2201 (±16.0) | 3514 (±14.6) | 170 (±4.3) | 108 (±7.9) |
| L-Phenylalanine | 15152 (±14.6) | 19238 (±8.5) | 560 (±3.0) | 473 (±2.5) |
| L-Tryptophane | 249 (±3.7) | 394 (±4.8) | 115 (±6.0) | 68 (±1.6) |
| L-Tyrosine | 2207 (±3.7) | 2274 (±9.9) | 472 (±2.2) | 400 (±0.8) |
| L-Valine | 25227 (±12.3) | 31515 (±8.3) | 755 (±4.2) | 637 (±1.8) |
| Inosine | — | 22 (±21.1) | — | — |
| Hypoxanthine | 269 (±1.8) | 315 (±4.5) | 50 (±2.5) | 58 (±14.4) |
| Xanthine | 161 (±4.8) | 151 (±3.1) | 13 (±9.5) | — |

TABLE 24

| Group 4: Salty | | | | |
|---|---|---|---|---|
| | SS5-R1 | SS6-R1 | FRP2-R1 | FRP3-R1 |
| Ammonium | 148786 (±8.9) | 165144 (±11.7) | 88008 (±12.6) | 76594 (±7.4) |
| Potassium | 78205 (±8.4) | 79848 (±11.6) | 18838 (±7.3) | 16148 (±17.8) |
| Magnesium | 9071 (±5.5) | 17127 (±3.5) | 6087 (±0.8) | 5646 (±5.9) |
| Sodium | 351936 (±2.2) | 332739 (±12.0) | 465401 (±7.3) | 510141 (±8.8) |
| Chloride | 31481 | 303800 | 322708 | 348660 |

TABLE 25

| Group 5: Sour | | | | |
|---|---|---|---|---|
| | SS5-R1 | SS6-R1 | FRP2-R1 | FRP3-R1 |
| Acetic acid | 4596 | 2699 | — | — |
| L-Lactic acid | 15319 | 6869 | — | — |

TABLE 26

| Group 6: Kokumi | | | | |
|---|---|---|---|---|
| | SS5-R1 | SS6-R1 | FRP2-R1 | FRP3-R1 |
| γ-Glu-Gly | 37 (±6.5) | 76 (±3.0) | 7 (±1.4) | 7 (±0.3) |
| γ-Glu-Glu | 82 (±3.2) | 76 (±2.7) | — | — |
| γ-Glu-Gln | 63 (±5.8) | 24 (±8.1) | — | — |

TABLE 26-continued

| Group 6: Kokumi | | | | |
|---|---|---|---|---|
| | SS5-R1 | SS6-R1 | FRP2-R1 | FRP3-R1 |
| γ-Glu-Leu | 146 (±5.9) | 252 (±4.6) | 0.2 (±6.9) | 0.2 (±6.6) |
| γ-Glu-Met | 7 (±15.7) | 17 (±10.1) | 0.1 (±41.8)) | 0.1 (±73.6)) |
| γ-Glu-His | 11 (±5.3) | 37 (±5.1) | 4 (±2.3) | 4 (±0.1) |

TABLE 27

| Group 7: Astringent | | | | |
|---|---|---|---|---|
| | SS5-R1 | SS6-R1 | FRP2-R1 | FRP3-R1 |
| γ-Glu-Ala | 132 (±5.2) | 94 (±3.5) | — | — |

TABLE 28

| Group 8: Umami-enhancing substances | | | | |
|---|---|---|---|---|
| | SS5-R1 | SS6-R1 | FRP2-R1 | FRP3-R1 |
| pyroGlu-Pro | 2355 (±3.4) | 1344 (±9.8) | — | — |
| pyroGlu-Glu | 332 (±1.1) | 404 (±9.2) | 2.6 (±17.5) | 9.8 (±10.6) |
| pyroGlu-Gln | 67 (±8.2) | 170 (±15.2) | 2 (±6.2) | 12.3 (±5.4) |
| pyroGlu-Ser | — | — | — | 2.6 (±3.5) |
| Pro-Pro | 447 (±6.1) | 288 (±14.1) | 6.8 (±7.8) | 3.5 (±9.1) |
| Pro-Glu | 265 (±2.1) | 262 (±13.5) | — | — |

TABLE 29

| Group 9: Salt-enhancing substances | | | | |
|---|---|---|---|---|
| | SS5-R1 | SS6-R1 | FRP2-R1 | FRP3-R1 |
| Pro-Ala | — | — | 4.4 (±18.2) | 16.4 (±3.6) |
| Pro-Lys | — | — | 2.4 (±3.5) | 2.3 (±6.4) |
| Pro-Ser | 124 (±1.1) | 78 (±13.8) | — | 7.8 (±1.4) |
| Pro-Val | 73 (±7.9) | 63 (±18.5) | 2.6 (±6.5) | 11.0 (±4.3) |
| Arg-Pro | 75 (±4.5) | 13 (±26.2) | 11.0 (±9.2) | 3.5 (±3.5) |
| Lys-Pro | — | — | 2.7 (±16.3) | — |
| Ser-Pro | 253 (±2.7) | 141 (±13.8) | 35.6 (±3.0) | 20.7 (±5.1) |
| Val-Pro | 303 (±3.9) | 104 (±13.2) | 13.9 (±3.5) | 8.4 (±0.9) |
| Arg-Gly | 10 (±10.9) | 4 (±24.5) | 4.2 (±1.5) | 5.7 (±0.6) |
| Gly-Arg | 16 (±8.9) | 16 (±11.1) | 11.4 (±10.6) | 19.8 (±5.0) |

The sensory evaluation of the 4 kinds of the recombinant sample 1 (SS5-R1, SS6-R1, FRP2-R1, FRP3-R1) was performed by the same method as Example 1, and the result of comparing the sensory evaluation result of the soy sauce samples (SS5, SS6) and fermented rice paste samples (FRP2, FRP3) of Example 1 and the sensory evaluation result of the recombinant sample 1 was shown in FIG. 7 and FIG. 8.

As could be confirmed in FIG. 7 (sensory evaluation result of the soy sauce sample and soy sauce recombinant sample 1) and FIG. 8 (sensory evaluation result of the fermented rice paste sample and fermented rice paste recombinant sample 1), it was confirmed that the recombinant sample 1 in which newly identified dipeptide compounds were additionally comprised showed taste characteristics similar to the taste characteristics of the conventional sample, and it was confirmed that it had a significantly excellent flavor modulating effect compared to the recombinant sample comprising no dipeptide compound (FIG. 3, FIG. 4).

Example 6. Analysis of Taste Components in Soy Sauce and Fermented Rice Paste Samples II As it was expected that there were additional taste components related to umami taste (umami taste, kokumi taste) and salty taste largely affecting umami taste in the soy sauce and fermented rice paste samples, an additional verification experiment for unknown substances was performed.

In order to find a long chain peptide compound, longer than dipeptide, having taste activity, a sensoproteomics approach method was used. Such a method is a method of combining a sensory evaluation method for confirming taste characteristics to proteomics method widely used in the life science field (J. Agric. Food Chem. 2018, 66, 42, 11092-11104).

In order to identify unknown long chain peptide compounds, they were analyzed using Ultra-High Performance Liquid Chromatography-Time-Of-Flight-Mass Spectrometry (UHPLC-Tof-MS) and De Novo Sequencing. The specific experimental method was described in Table 30 below.

TABLE 30

| Analysis item | Equipment | Analysis condition |
|---|---|---|
| Peptide (Untargeted long chain peptide) | Triple TOF 6600 mass spectrometer with Shimadzu Nexera X2 system | Kinetex C18 column, 150 × 2 mm, 1.7 μm; Phenomenex) 0.3 mL/min A: 1% Formic acid/H2O B: 1% Formic acid/ Acetonitrile |

TABLE 30-continued

| Analysis item | Equipment | Analysis condition |
|---|---|---|
| Peptide (Targeted long chain peptide) | 5500 + QTrap Mass Spectroeter | Kinetex, 1.7 μm C8, 100 Â (2.1 × 100 mm; Phenomenex) 0.3 mL/min A: 1% Formic acid/H2O B: 1% Formic acid/ Acetonitrile |

As the result of analysis, the newly identified long chain peptides were described in Table 31 below.

TABLE 31

| No | Long chain peptide | SEQ ID NO: |
|---|---|---|
| 1 | ALDPLPT | 1 |
| 2 | DGFP | 2 |
| 3 | DGML | 3 |
| 4 | DNEDTP | 4 |
| 5 | DTDEPN | 5 |
| 6 | EEL | 6 |
| 7 | EEV | 7 |
| 8 | EEY | 8 |
| 9 | ESLPALP | 9 |
| 10 | EVGYGY | 10 |
| 11 | LDYY | 11 |
| 12 | LPPP | 12 |
| 13 | MTTFTW | 13 |
| 14 | PPPP | 14 |
| 15 | PPPPP | 15 |
| 16 | DAPL | 16 |
| 17 | DVL | 17 |
| 18 | GGPF | 18 |
| 19 | GNPF | 19 |
| 20 | EVLK | 20 |

TABLE 31-continued

| No | Long chain peptide | SEQ ID NO: |
|---|---|---|
| 21 | FADSL | 21 |
| 22 | LAL | 22 |
| 23 | LLL | 23 |
| 24 | LLQ | 24 |
| 25 | LPL | 25 |
| 26 | PLL | 26 |
| 27 | TPL | 27 |
| 28 | VLL | 28 |

Each taste characteristic of the long chain peptide compounds newly analyzed from the soy sauce and fermented rice paste samples was confirmed through Taste Dilution Analysis (TDA), Comparative Taste Dilution Analysis (cTDA) experiments, and it was confirmed that they mostly enhanced umami taste, kokumi taste, and salty taste related to umami taste. The threshold values sensed sensually of each long chain peptide compounds were confirmed, and the result was shown in FIG. 9 (result in the soy sauce sample) and FIG. 10 (result in the fermented rice paste sample).

FIG. 9 and FIG. 10 are drawings which show the minimal cognitive concentrations of various taste characteristics of each long chain peptide compound, and each long chain peptide compound had a high minimal cognitive concentration for bitter taste and astringent taste and the like, but a low minimal cognitive concentration for tastes related to umami taste such as umami taste and kokumi taste, so it could be confirmed that the long chain peptide compound modulated flavor.

In FIG. 9 and FIG. 10, iTC and mTC mean minimal concentrations at which the taste is sensed, and iTC indicates the minimal concentration at which the taste is sensed when each long chain peptide is comprised in water, and mTC indicates the minimal concentration at which the taste is sensed when each long chain peptide is comprised in the recombinant sample (soy sauce sample, fermented rice paste sample). It was confirmed that all the long chain peptides shown in FIG. 9 and FIG. 10 exhibited the astringent taste and bitter taste, and did not exhibit tastes related to flavor modulating such as umami taste, kokumi taste, salty taste, and the like, when comprised in water, but rather exhibited tastes related to flavor modulating such as umami taste, kokumi taste, and the like, when the long chain peptide was comprised in the recombinant sample comprising other taste components (mTC).

In addition, the minimal concentration at which such a taste can be sensed (Threshold) was lower than the case in which the long chain peptide was comprised in the recombinant sample in which other taste components were comprised (mTC), and the case in which it was comprised in water (iTC), so it was confirmed that when the long chain peptide was comprised in the recombinant sample in which other taste components were comprised, even if it was comprised in a trace amount, the taste related to flavor modulating could be expressed.

Example 7. Sensory Evaluation of Soy Sauce and Fermented Rice Paste Recombinant Sample Comprising Newly Identified Dipeptides and Long Chain Peptides By adding newly identified dipeptide compounds in Table 20 and newly identified long chain peptide compounds in Table 31 to the recombinant sample prepared in Example 3, recombinant sample 2 (R1-recombinant2) of the soy sauce and fermented soy paste was prepared. In other words, the recombinant sample 2 of soy sauce and fermented rice paste below comprise the long chain peptide compounds of Table 32 below, in addition to the recombinant sample 1 having the compositions of Table 21 to Table 29. The values of Table 32 mean concentrations (umol/L) of each component, and the relative standard deviation (RSD (%)) was described after the numerical value.

TABLE 32

| Long chain peptide | SEQ ID NO | SS5-R2 | SS6-R2 | FRP2-R2 | FRP3-R2 |
|---|---|---|---|---|---|
| ALDPLPT | 1 | 0.58 (±12.9) | 0.06 (±8.7) | — | — |
| DGFP | 2 | | 0.09 (±5.0) | | 0.01 (±10.0) |
| DGML | 3 | 0.51 (±5.9) | 8.91 (±10.7) | 0.03 (±12.5) | 0.13 (±5.4) |
| DNEDTP | 4 | 3.33 (±8.3) | 1.17 (±13.6) | 1.17 (±13.7) | 0.006 (±20.3) |
| EEL | 6 | 1.91 (±49.3) | 2.9 (±47.8) | — | — |
| EEV | 7 | 1.37 (±29.9) | 3.05 (±26.1) | — | — |
| EEY | 8 | 0.35 (±16.4) | 0.64 (±31.1) | — | — |
| ESLPALP | 9 | 0.52 (±17.1) | — | — | — |
| EVGYGY | 10 | 0.77 (±11.7) | 0.08 (±12.7) | 0.002 | — |
| LDYY | 11 | 3.52 (±8.4) | 0.6 (±3.7) | 0.003 | 0.013 (±18.3) |
| LPPP | 12 | 1.87 (±2.2) | 1.34 (±2.4) | 0.35 (±17.6) | 0.15 (±3.3) |
| MTTFTW | 13 | 1.23 (±4.9) | 0.65 (±3.8) | | |
| PPPP | 14 | 1.78 (±36) | 3.33 (±2.9) | 0.1 (±7.4) | 0.02 (±4.2) |

TABLE 32-continued

| Long chain peptide | SEQ ID NO | SS5-R2 | SS6-R2 | FRP2-R2 | FRP3-R2 |
|---|---|---|---|---|---|
| PPPPP | 15 | 1.08 (±3.8) | 0.61 (±1.4) | 0.04 (±6.7) | 0.006 (±1.9) |
| DAPL | 16 | 0.03 (±9.5) | 0.02 (±1.0) | 0.23 (±11.9) | 0.09 (±2.7) |
| DVL | 17 | 0.54 (±50.9) | 0.71 (±31.8) | 0.33 (±27.5) | 0.96 (±10.5) |
| GGPF | 18 | 0.04 (±52.3) | 0.01 (±41.0) | 0.02 (±37.7) | 0.06 (±9.8) |
| EVLK | 20 | — | — | 0.9 (±28.3) | 0.09 (±4.8) |
| FADSL | 21 | — | — | — | <0.001 (±1.4) |
| LAL | 22 | 0.21 (±9.5) | 0.04 (±7.0) | 0.6 (±30.1) | 0.02 (±11.4) |
| LLL | 23 | 0.06 (±0.8) | 0.02 (±0.6) | 0.01 (±21.6) | 0.01 (±0.8) |
| LLQ | 24 | 0.03 (±19.4) | | 0.08 (±60.2) | 0.14 (±18.3) |
| LPL | 25 | — | — | 0.03 (±6.4) | 0.2 (±3.5) |
| PLL | 26 | 0.09 (±9.4) | 0.09 (±9.4) | 0.03 (±12.2) | 0.06 (±2.0) |
| TPL | 27 | 0.39 (±4.1) | 0.15 (±14.6) | 0.15 (±44.4) | 1.9 (±19.0) |
| VLL | 28 | — | — | 0.04 (±24.2) | 0.05 (±4.2) |

The sensory evaluation of 4 kinds of the recombinant sample 2 (SS5-R2, SS6-R2, FRP2-R2, FRP3-R2) was performed by the same method as Example 1, and the result of comparing the sensory evaluation result of 4 kinds of the recombinant sample 1 (SS5-R1, SS6-R1, FRP2-R1, FRP3-R1) and the sensory evaluation result of the recombinant sample 2 of Example 5 was shown in FIG. 11.

The sensory evaluation result of the soy sauce and fermented rice paste samples (SS5, SS6, FRP2, FRP3, Control group 1 to control group 4, respectively) and each of the recombinant samples (Example 3, SS5-BR, SS6-BR, FRP2-BR, FRP3-BR, Experimental groups 1-1, 2-1, 3-1, 4-1, respectively), recombinant sample 1 (Example 5, SS5-R1, SS6-R1, FRP2-R1, FR3-R1, Experimental groups 1-2, 2-2, 3-2, 4-2, respectively), recombinant sample 2 (Example 7, SS5-R2, SS6-R2, FRP2-R2, FRP3-R2, Experimental groups 1-3, 2-3, 3-3, 4-3, respectively) were summarized in Table 33 to Table 36 below. Values of measuring 6 taste attributes (sour taste, salty taste, sweet taste, bitter taste, umami tastes, kokumi taste) with a 5-point index were described, and the difference between the experimental group value and the control group value was described in parentheses after each of the experimental group values.

TABLE 33

| | SS5 (Control group 1) | SS5-BR (Experimental group 1-1) | SS5-R1 Experimental group 1-2) | SS5-R2 (Experimental group 1-3) |
|---|---|---|---|---|
| Sour taste | 1.3 | 1.0 (−0.3) | 1.3 (0) | 1.3 (0) |
| Salty taste | 3.4 | 2.2 (−1.2) | 3.4 (0) | 3.3 (−0.1) |
| Sweet taste | 0.7 | 0.8 (0.1) | 0.7 (0) | 0.7 (0) |
| Bitter taste | 2.0 | 1.8 (−0.2) | 2.0 (0) | 1.7 (−0.3) |
| Umami | 2.6 | 2.4 (−0.2) | 2.7 (0.1) | 2.9 (0.3) |
| Kokumi | 1.6 | 1.7 (0.1) | 1.7 (0.1) | 1.8 (0.2) |

TABLE 34

| | SS6 (Control group 2) | SS6-BR (Experimental group 2-1) | SS6-R1 (Experimental group 2-2) | SS6-R2 (Experimental group 2-3) |
|---|---|---|---|---|
| Sour taste | 1.2 | 1.0 (−0.2) | 1.3 (0.1) | 1.2 (0) |
| Salty taste | 3.1 | 2.0 (−1.1) | 3.1 (0) | 3.1 (0) |
| Sweet taste | 1.2 | 1.3 (0.1) | 1.1 (−0.1) | 1.4 (0.2) |
| Bitter taste | 1.8 | 1.5 (−0.3) | 1.8 (0) | 1.4 (−0.4) |
| Umami | 2.7 | 2.4 (−0.3) | 2.8 (0.1) | 2.9 (0.2) |
| Kokumi | 1.7 | 1.3 (−0.4) | 1.7 (0) | 1.8 (0.1) |

TABLE 35

| | FRP2 (Control group 3) | FRP2-BR (Experimental group 3-1) | FRP2-R1 (Experimental group 3-2) | FRP2-R2 (Experimental group 3-3) |
|---|---|---|---|---|
| Sour taste | 0.9 | 0.8 (−0.1) | 0.8 (−0.1) | 0.8 (−0.1) |
| Salty taste | 3.0 | 2.2 (−0.8) | 2.7 (−0.3) | 2.7 (−0.3) |
| Sweet taste | 1.8 | 2.3 (0.5) | 1.8 (0) | 2 (0.2) |
| Bitter taste | 0.4 | 0.3 (−0.1) | 0.5 (0.1) | 0.6 (0.2) |
| Umami | 1.8 | 1.4 (−0.4) | 1.6 (−0.2) | 1.7 (−0.1) |
| Kokumi | 1.4 | 0.9 (−0.5) | 1.3 (−0.1) | 1.5 (0.1) |

TABLE 36

| | FRP3 (Control group 4) | FRP3-BR (Experimental group 4-1) | FRP3-R1 (Experimental group 4-2) | FRP3-R2 (Experimental group 4-3) |
|---|---|---|---|---|
| Sour taste | 1.0 | 0.8 (−0.2) | 0.9 (−0.1) | 0.9 (−0.1) |
| Salty taste | 2.8 | 2 (−0.8) | 2.5 (−0.3) | 2.6 (−0.2) |
| Sweet taste | 2.1 | 2.5 (0.4) | 2.0 (−0.1) | 2.2 (0.1) |
| Bitter taste | 0.3 | 0.5 (0.2) | 0.4 (0.1) | 0.3 (0) |
| Umami | 2.0 | 1.4 (−0.6) | 1.8 (−0.2) | 1.9 (−0.1) |
| Kokumi | 1.2 | 0.6 (−0.6) | 1.0 (−0.2) | 1.1 (−0.1) |

As could be confirmed in Table 33 to Table 36 above, when 6 taste attributes were compared, samples comprising common taste components that account for most (95% or more) of the taste components of the food samples (experimental groups 1-1, 2-1, 3-1, 4-1) had a very significant difference in the sensory evaluation result with the food samples (control groups 1, 2, 3, 4).

It was confirmed that taste characteristics became similar to the food sample, when trace substances (dipeptide compound, or dipeptide compound and long chain peptide compound) among the total taste components, and it was confirmed that these trace components are important components exhibiting an umami taste in the soy sauce and fermented rice paste.

Newly Identified Dipeptide and Long Chain Peptide Compounds

The taste active compounds and taste modulation compounds newly identified in the present application were summarized in Table 37 below, and total 127 compounds were newly identified.

TABLE 37

| No | Compound group | Dipeptide and long chain peptide | SEQ ID NO: |
|---|---|---|---|
| 1 | Prolyl peptides | Pro-Ala | — |
| 2 | Prolyl peptides | Pro-Asn | — |
| 3 | Prolyl peptides | Pro-Glu | — |
| 4 | Prolyl peptides | Pro-Gln | — |
| 5 | Prolyl peptides | Pro-His | — |
| 6 | Prolyl peptides | Pro-Ile | — |
| 7 | Prolyl peptides | Pro-Leu | — |
| 8 | Prolyl peptides | Pro-Met | — |
| 9 | Prolyl peptides | Pro-Pro | — |
| 10 | Prolyl peptides | Pro-Phe | — |
| 11 | Prolyl peptides | Pro-Ser | — |
| 12 | Prolyl peptides | Pro-Thr | — |
| 13 | Prolyl peptides | Pro-Val | — |
| 14 | Prolyl peptides | Ala-Pro | — |
| 15 | Prolyl peptides | Pro-Gly | — |
| 16 | Prolyl peptides | Arg-Pro | — |

TABLE 37-continued

| No | Compound group | Dipeptide and long chain peptide | SEQ ID NO: |
|---|---|---|---|
| 17 | Prolyl peptides | Asn-Pro | — |
| 18 | Prolyl peptides | Asp-Pro | — |
| 19 | Prolyl peptides | Thr-Pro | — |
| 20 | Prolyl peptides | His-Pro | — |
| 21 | Prolyl peptides | Ile-Pro | — |
| 22 | Prolyl peptides | Leu-Pro | — |
| 23 | Prolyl peptides | Ser-Pro | — |
| 24 | Prolyl peptides | Gly-Pro | — |
| 25 | Prolyl peptides | Tyr-Pro | — |
| 26 | Prolyl peptides | Val-Pro | — |
| 27 | Prolyl peptides | Glu-Pro | — |
| 28 | Prolyl peptides | Pro-Tyr | — |
| 29 | Prolyl peptides | Pro-Asp | — |
| 30 | Prolyl peptides | Pro-Cys | |
| 31 | Prolyl peptides | Cys-Pro | |
| 32 | Prolyl peptides | Gln-Pro | |
| 33 | Prolyl peptides | Pro-Lys | |
| 34 | Prolyl peptides | Lys-Pro | |
| 35 | Prolyl peptides | Met-Pro | |
| 36 | Prolyl peptides | Phe-Pro | |
| 37 | Prolyl peptides | Pro-Trp | |
| 38 | Prolyl peptides | Trp-Pro | |
| 39 | Prolyl peptides | D-Pro-L-Pro | |
| 40 | Arginyl peptides | Arg-Ala | — |
| 41 | Arginyl peptides | Arg-Gly | — |
| 42 | Arginyl peptides | Arg-Gln | — |
| 43 | Arginyl peptides | Gly-Arg | — |
| 44 | Arginyl peptides | Val-Arg | — |
| 45 | Arginyl peptides | Arg-Val | — |
| 46 | Arginyl peptides | Ala-Arg | — |
| 47 | Arginyl peptides | Pro-Arg | — |
| 48 | Arginyl peptides | Arg-Ser | — |
| 49 | Arginyl peptides | Asp-Arg | — |
| 50 | Arginyl peptides | Arg-Asp | — |
| 51 | Arginyl peptides | Arg-Leu | — |
| 52 | Arginyl peptides | Lys-Arg | — |
| 53 | Arginyl peptides | Glu-Arg | — |
| 54 | α-Glutamyl peptides | α-Glu-Ala | — |

TABLE 37-continued

| No | Compound group | Dipeptide and long chain peptide | SEQ ID NO: |
|---|---|---|---|
| 55 | α-Glutamyl peptides | α-Glu-Gly | — |
| 56 | α-Glutamyl peptides | α-Glu-Ser | — |
| 57 | α-Glutamyl peptides | α-Glu-Val | — |
| 58 | α-Glutamyl peptides | α-Glu-The | — |
| 59 | α-Glutamyl peptides | α-Glu-Pro | — |
| 60 | α-Glutamyl peptides | α-Glu-Leu | — |
| 61 | α-Glutamyl peptides | α-Glu-Ile | — |
| 62 | α-Glutamyl peptides | α-Glu-Lys | — |
| 63 | α-Glutamyl peptides | α-Glu-Glu | — |
| 64 | α-Glutamyl peptides | α-Glu-Gln | — |
| 65 | α-Glutamyl peptides | α-Glu-His | — |
| 66 | α-Glutamyl peptides | α-Glu-Phe | — |
| 67 | α-Glutamyl peptides | α-Glu-Tyr | — |
| 68 | α-Glutamyl peptides | α-Glu-Asp | — |
| 69 | α-Glutamyl peptides | α-Glu-Arg | — |
| 70 | α-Glutamyl peptides | α-Glu-Trp | — |
| 71 | γ-Glutamyl peptides | γ-Glu-Gly | — |
| 72 | γ-Glutamyl peptides | γ-Glu-Ala | — |
| 73 | γ-Glutamyl peptides | γ-Glu-Pro | — |
| 74 | γ-Glutamyl peptides | γ-Glu-Val | — |
| 75 | γ-Glutamyl peptides | γ-Glu-Ser | — |
| 76 | γ-Glutamyl peptides | γ-Glu-Ile | — |
| 77 | γ-Glutamyl peptides | γ-Glu-Thr | — |
| 78 | γ-Glutamyl peptides | γ-Glu-Leu | — |
| 79 | γ-Glutamyl peptides | γ-Glu-Asn | — |
| 80 | γ-Glutamyl peptides | γ-Glu-Lys | — |
| 81 | γ-Glutamyl peptides | γ-Glu-Glu | — |
| 82 | γ-Glutamyl peptides | γ-Glu-His | — |
| 83 | γ-Glutamyl peptides | γ-Glu-Trp | — |
| 84 | γ-Glutamyl peptides | γ-Glu-Asp | — |
| 85 | γ-Glutamyl peptides | γ-Glu-Tyr | — |
| 86 | γ-Glutamyl peptides | γ-Glu-Arg | — |
| 87 | Glutamyl peptides | Ala-Glu | — |
| 88 | Glutamyl peptides | Asn-Glu | — |
| 89 | Glutamyl peptides | His-Glu | — |
| 90 | Glutamyl peptides | Asp-Glu | — |
| 91 | Glutamyl peptides | Phe-Glu | — |
| 92 | Glutamyl peptides | Tyr-Glu | — |
| 93 | Glutamyl peptides | Ile-Glu | — |
| 94 | Glutamyl peptides | Val-Glu | — |
| 95 | Glutamyl peptides | Ser-Glu | — |
| 96 | Glutamyl peptides | Pro-Glu | — |
| 97 | Glutamyl peptides | Thr-Glu | — |
| 98 | Glutamyl peptides | Met-Glu | — |
| 99 | Glutamyl peptides | Leu-Glu | — |
| 100 | Long chain peptides | ALDPLPT | 1 |
| 101 | Long chain peptides | DGFP | 2 |
| 102 | Long chain peptides | DGML | 3 |
| 103 | Long chain peptides | DNEDTP | 4 |
| 104 | Long chain peptides | DTDEPN | 5 |
| 105 | Long chain peptides | EEL | 6 |
| 106 | Long chain peptides | EEV | 7 |
| 107 | Long chain peptides | EEY | 8 |
| 108 | Long chain peptides | ESLPALP | 9 |
| 109 | Long chain peptides | EVGYGY | 10 |
| 110 | Long chain peptides | LDYY | 11 |
| 111 | Long chain peptides | LPPP | 12 |
| 112 | Long chain peptides | MTTFTW | 13 |
| 113 | Long chain peptides | PPPP | 14 |
| 114 | Long chain peptides | PPPPP | 15 |
| 115 | Long chain peptides | DAPL | 16 |
| 116 | Long chain peptides | DVL | 17 |
| 117 | Long chain peptides | GGPF | 18 |
| 118 | Long chain peptides | GNPF | 19 |
| 119 | Long chain peptides | EVLK | 20 |
| 120 | Long chain peptides | FADSL | 21 |
| 121 | Long chain peptides | LAL | 22 |
| 122 | Long chain peptides | LLL | 23 |
| 123 | Long chain peptides | LLQ | 24 |
| 124 | Long chain peptides | LPL | 25 |
| 125 | Long chain peptides | PLL | 26 |
| 126 | Long chain peptides | TPL | 27 |
| 127 | Long chain peptides | VLL | 28 |

From the above description, those skilled in the art to which the present invention pertains will understand that the present invention can be implemented in other specific forms without changing its technical spirit or essential features. In this regard, the examples described above should be understood as illustrative and not restrictive in all aspects. The scope of the present invention should be interpreted as all changed or modified forms derived from the meaning and scope of the claims described below and equivalent concepts thereof are included in the scope of the present invention.

The invention claimed is:

1. A method for preparing a flavoring agent, comprising mixing compounds including γ-Glu-Gly, γ-Glu-Leu, γ-Glu-Met, γ-Glu-His, pyroGlu-Glu, pyroGlu-Gln, Pro-Pro, Pro-Val, Arg-Pro, Ser-Pro, Val-Pro, Arg-Gly, and Gly-Arg.

2. The method according to claim 1, wherein the compounds further include at least one selected from the group consisting of Pro-Ala, Pro-Lys, Pro-Ser, Lys-Pro, Pro-Glu, γ-Glu-Glu, γ-Glu-Gln, γ-Glu-Ala, pyroGlu-Pro and pyroGlu-Ser.

3. The method according to claim 1, wherein the compounds further include γ-Glu-Glu, γ-Glu-Gln, γ-Glu-Ala, pyroGlu-Pro, Pro-Glu, and Pro-Ser.

4. The method according to claim 1, wherein the compounds further include Pro-Ala, Pro-Lys, and Lys-Pro.

5. The method according to claim 1, wherein the compounds further include pyroGlu-Ser, Pro-Ala, Pro-Lys, and Pro-Ser.

6. The method for flavor modulating, comprising adding the flavoring agent prepared by the method of claim 1 to a food.

7. The method according to claim 1, wherein the compounds further include at least one selected from the group consisting of of ALDPLPT (SEQ ID NO: 1), DGFP (SEQ ID NO: 2), DGML (SEQ ID NO: 3), DNEDTP (SEQ ID NO: 4), DTDEPN (SEQ ID NO: 5), EEL (SEQ ID NO: 6), EEV (SEQ ID NO: 7), EEY (SEQ ID NO: 8), ESLPALP (SEQ ID NO: 9), EVGYGY (SEQ ID NO: 10), LDYY (SEQ ID NO: 11), LPPP (SEQ ID NO: 12), MTTFTW (SEQ ID NO: 13), PPPP (SEQ ID NO: 14), PPPPP (SEQ ID NO: 15), DAPL (SEQ ID NO: 16), DVL (SEQ ID NO: 17), GGPF (SEQ ID NO: 18), GNPF (SEQ ID NO: 19), EVLK (SEQ ID NO: 20), FADSL (SEQ ID NO: 21), LAL (SEQ ID NO: 22), LLL (SEQ ID NO: 23), LLQ (SEQ ID NO: 24), LPL (SEQ ID NO: 25), PLL (SEQ ID NO: 26), TPL (SEQ ID NO: 27), and VLL (SEQ ID NO: 28).

8. The method according to claim 7, wherein the compounds include DGML (SEQ ID NO: 3), DNEDTP (SEQ ID NO: 4), LDYY (SEQ ID NO: 11), LPPP (SEQ ID NO: 12), PPPP (SEQ ID NO: 14), PPPPP (SEQ ID NO: 15), DAPL (SEQ ID NO: 16), DVL (SEQ ID NO: 17), GGPF (SEQ ID NO: 18), LAL (SEQ ID NO: 22), LLL (SEQ ID NO: 23), PLL (SEQ ID NO: 26), and TPL (SEQ ID NO: 27).

9. The method according to claim 8, wherein the compounds include at least one selected from the group consisting of of ALDPLPT (SEQ ID NO: 1), DGFP (SEQ ID NO: 2), EEL (SEQ ID NO: 6), EEV (SEQ ID NO: 7), EEY (SEQ ID NO: 8), ESLPALP (SEQ ID NO: 9), EVGYGY (SEQ ID NO: 10), MTTFTW (SEQ ID NO: 13), EVLK (SEQ ID NO: 20), FADSL (SEQ ID NO: 21), LLQ (SEQ ID NO: 24), LPL (SEQ ID NO: 25), and VLL (SEQ ID NO: 28).

10. The method according to claim 8, wherein the compounds include ALDPLPT (SEQ ID NO: 1), EEL (SEQ ID NO: 6), EEV (SEQ ID NO: 7), EEY (SEQ ID NO: 8), ESLPALP (SEQ ID NO: 9), EVGYGY (SEQ ID NO: 10), MTTFTW (SEQ ID NO: 13) and LLQ (SEQ ID NO: 24).

11. The method according to claim 8, wherein the compounds include ALDPLPT (SEQ ID NO: 1), DGFP (SEQ ID NO: 2), EEL (SEQ ID NO: 6), EEV (SEQ ID NO: 7), EEY (SEQ ID NO: 8), EVGYGY (SEQ ID NO: 10) and MTTFTW (SEQ ID NO: 13).

12. The method according to claim 8, wherein the compounds include EVGYGY (SEQ ID NO: 10), EVLK (SEQ ID NO: 20), LLQ (SEQ ID NO: 24), LPL (SEQ ID NO: 25) and VLL (SEQ ID NO: 28).

13. The method according to claim 8, wherein the compounds include DGFP (SEQ ID NO: 2), EVLK (SEQ ID NO: 20), FADSL (SEQ ID NO: 21), LLQ (SEQ ID NO: 24), LPL (SEQ ID NO: 25) and VLL (SEQ ID NO: 28).

* * * * *

```
                              SEQUENCE LISTING


<160> NUMBER OF SEQ ID NOS: 28

<210> SEQ ID NO 1
<211> LENGTH: 7
<212> TYPE: PRT
<213> ORGANISM: Artificial Sequence
<220> FEATURE:
<223> OTHER INFORMATION: Long chain peptides

<400> SEQUENCE: 1

Ala Leu Asp Pro Leu Pro Thr
1               5


<210> SEQ ID NO 2
<211> LENGTH: 4
<212> TYPE: PRT
<213> ORGANISM: Artificial Sequence
<220> FEATURE:
<223> OTHER INFORMATION: Long chain peptides

<400> SEQUENCE: 2

Asp Gly Phe Pro
1


<210> SEQ ID NO 3
<211> LENGTH: 4
<212> TYPE: PRT
<213> ORGANISM: Artificial Sequence
<220> FEATURE:
<223> OTHER INFORMATION: Long chain peptides

<400> SEQUENCE: 3

Asp Gly Met Leu
1


<210> SEQ ID NO 4
<211> LENGTH: 6
<212> TYPE: PRT
<213> ORGANISM: Artificial Sequence
<220> FEATURE:
<223> OTHER INFORMATION: Long chain peptides

<400> SEQUENCE: 4

Asp Asn Glu Asp Thr Pro
1               5


<210> SEQ ID NO 5
<211> LENGTH: 6
<212> TYPE: PRT
<213> ORGANISM: Artificial Sequence
<220> FEATURE:
<223> OTHER INFORMATION: Long chain peptides

<400> SEQUENCE: 5

Asp Thr Asp Glu Pro Asn
1               5


<210> SEQ ID NO 6
<211> LENGTH: 3
<212> TYPE: PRT
<213> ORGANISM: Artificial Sequence
<220> FEATURE:
<223> OTHER INFORMATION: Long chain peptides
```

<400> SEQUENCE: 6

Glu Glu Leu
1

<210> SEQ ID NO 7
<211> LENGTH: 3
<212> TYPE: PRT
<213> ORGANISM: Artificial Sequence
<220> FEATURE:
<223> OTHER INFORMATION: Long chain peptides

<400> SEQUENCE: 7

Glu Glu Val
1

<210> SEQ ID NO 8
<211> LENGTH: 3
<212> TYPE: PRT
<213> ORGANISM: Artificial Sequence
<220> FEATURE:
<223> OTHER INFORMATION: Long chain peptides

<400> SEQUENCE: 8

Glu Glu Tyr
1

<210> SEQ ID NO 9
<211> LENGTH: 7
<212> TYPE: PRT
<213> ORGANISM: Artificial Sequence
<220> FEATURE:
<223> OTHER INFORMATION: Long chain peptides

<400> SEQUENCE: 9

Glu Ser Leu Pro Ala Leu Pro
1               5

<210> SEQ ID NO 10
<211> LENGTH: 6
<212> TYPE: PRT
<213> ORGANISM: Artificial Sequence
<220> FEATURE:
<223> OTHER INFORMATION: Long chain peptides

<400> SEQUENCE: 10

Glu Val Gly Tyr Gly Tyr
1               5

<210> SEQ ID NO 11
<211> LENGTH: 4
<212> TYPE: PRT
<213> ORGANISM: Artificial Sequence
<220> FEATURE:
<223> OTHER INFORMATION: Long chain peptides

<400> SEQUENCE: 11

Leu Asp Tyr Tyr
1

<210> SEQ ID NO 12
<211> LENGTH: 4
<212> TYPE: PRT
<213> ORGANISM: Artificial Sequence
<220> FEATURE:
<223> OTHER INFORMATION: Long chain peptides

<400> SEQUENCE: 12

Leu Pro Pro Pro
1

<210> SEQ ID NO 13
<211> LENGTH: 6
<212> TYPE: PRT
<213> ORGANISM: Artificial Sequence
<220> FEATURE:
<223> OTHER INFORMATION: Long chain peptides

<400> SEQUENCE: 13

Met Thr Thr Phe Thr Trp
1               5

<210> SEQ ID NO 14
<211> LENGTH: 4
<212> TYPE: PRT
<213> ORGANISM: Artificial Sequence
<220> FEATURE:
<223> OTHER INFORMATION: Long chain peptides

<400> SEQUENCE: 14

Pro Pro Pro Pro
1

<210> SEQ ID NO 15
<211> LENGTH: 5
<212> TYPE: PRT
<213> ORGANISM: Artificial Sequence
<220> FEATURE:
<223> OTHER INFORMATION: Long chain peptides

<400> SEQUENCE: 15

Pro Pro Pro Pro Pro
1               5

<210> SEQ ID NO 16
<211> LENGTH: 4
<212> TYPE: PRT
<213> ORGANISM: Artificial Sequence
<220> FEATURE:
<223> OTHER INFORMATION: Long chain peptides

<400> SEQUENCE: 16

Asp Ala Pro Leu
1

<210> SEQ ID NO 17
<211> LENGTH: 3
<212> TYPE: PRT
<213> ORGANISM: Artificial Sequence
<220> FEATURE:
<223> OTHER INFORMATION: Long chain peptides

<400> SEQUENCE: 17

Asp Val Leu
1

<210> SEQ ID NO 18
<211> LENGTH: 4
<212> TYPE: PRT
<213> ORGANISM: Artificial Sequence
<220> FEATURE:
<223> OTHER INFORMATION: Long chain peptides

<400> SEQUENCE: 18

Gly Gly Pro Phe
1

<210> SEQ ID NO 19
<211> LENGTH: 4
<212> TYPE: PRT
<213> ORGANISM: Artificial Sequence
<220> FEATURE:
<223> OTHER INFORMATION: Long chain peptides

<400> SEQUENCE: 19

Gly Asn Pro Phe
1

<210> SEQ ID NO 20
<211> LENGTH: 4
<212> TYPE: PRT
<213> ORGANISM: Artificial Sequence
<220> FEATURE:
<223> OTHER INFORMATION: Long chain peptides

<400> SEQUENCE: 20

Glu Val Leu Lys
1

<210> SEQ ID NO 21
<211> LENGTH: 5
<212> TYPE: PRT
<213> ORGANISM: Artificial Sequence
<220> FEATURE:
<223> OTHER INFORMATION: Long chain peptides

<400> SEQUENCE: 21

Phe Ala Asp Ser Leu
1               5

<210> SEQ ID NO 22
<211> LENGTH: 3
<212> TYPE: PRT
<213> ORGANISM: Artificial Sequence
<220> FEATURE:
<223> OTHER INFORMATION: Long chain peptides

<400> SEQUENCE: 22

Leu Ala Leu
1

<210> SEQ ID NO 23
<211> LENGTH: 3
<212> TYPE: PRT
<213> ORGANISM: Artificial Sequence
<220> FEATURE:
<223> OTHER INFORMATION: Long chain peptides

<400> SEQUENCE: 23

Leu Leu Leu
1

<210> SEQ ID NO 24
<211> LENGTH: 3
<212> TYPE: PRT
<213> ORGANISM: Artificial Sequence
<220> FEATURE:
<223> OTHER INFORMATION: Long chain peptides

<400> SEQUENCE: 24

-continued

```
Leu Leu Gln
1


<210> SEQ ID NO 25
<211> LENGTH: 3
<212> TYPE: PRT
<213> ORGANISM: Artificial Sequence
<220> FEATURE:
<223> OTHER INFORMATION: Long chain peptides

<400> SEQUENCE: 25

Leu Pro Leu
1


<210> SEQ ID NO 26
<211> LENGTH: 3
<212> TYPE: PRT
<213> ORGANISM: Artificial Sequence
<220> FEATURE:
<223> OTHER INFORMATION: Long chain peptides

<400> SEQUENCE: 26

Pro Leu Leu
1


<210> SEQ ID NO 27
<211> LENGTH: 3
<212> TYPE: PRT
<213> ORGANISM: Artificial Sequence
<220> FEATURE:
<223> OTHER INFORMATION: Long chain peptides

<400> SEQUENCE: 27

Thr Pro Leu
1


<210> SEQ ID NO 28
<211> LENGTH: 3
<212> TYPE: PRT
<213> ORGANISM: Artificial Sequence
<220> FEATURE:
<223> OTHER INFORMATION: Long chain peptides

<400> SEQUENCE: 28

Val Leu Leu
1
```